United States Patent
Yadav

(10) Patent No.: US 12,355,061 B2
(45) Date of Patent: Jul. 8, 2025

(54) HIGH VOLTAGE BATTERIES USING GELLED ELECTROLYTE

(71) Applicant: RESEARCH FOUNDATION OF THE CITY UNIVERSITY OF NEW YORK, New York, NY (US)

(72) Inventor: Gautam G. Yadav, New York, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 751 days.

(21) Appl. No.: 17/622,029

(22) PCT Filed: Jun. 26, 2020

(86) PCT No.: PCT/US2020/039927
§ 371 (c)(1),
(2) Date: Dec. 22, 2021

(87) PCT Pub. No.: WO2020/264375
PCT Pub. Date: Dec. 30, 2020

(65) Prior Publication Data
US 2022/0278319 A1    Sep. 1, 2022

Related U.S. Application Data

(60) Provisional application No. 62/895,706, filed on Sep. 4, 2019, provisional application No. 62/877,528, filed
(Continued)

(51) Int. Cl.
H01M 4/00    (2006.01)
H01M 4/134    (2010.01)
(Continued)

(52) U.S. Cl.
CPC .......... H01M 4/134 (2013.01); H01M 4/466 (2013.01); H01M 4/50 (2013.01); H01M 4/625 (2013.01);
(Continued)

(58) Field of Classification Search
CPC .......... H01M 4/46; H01M 10/26; H01M 4/50; H01M 4/62; H01M 4/66
See application file for complete search history.

(56) References Cited

U.S. PATENT DOCUMENTS 9,281,538 B2    3/2016   Ueda
2005/0175894 A1    8/2005   Visco et al.
(Continued)

FOREIGN PATENT DOCUMENTS

WO    2012161917 A1    11/2012
WO    WO-2018075809 A1 *    4/2018    ........... C01G 25/006
(Continued)

OTHER PUBLICATIONS

Cao et al. Lithium-Stuffed Garnet Electrolytes With a Reduced Surface Defect Density and Methods of Making and Using the Same, Apr. 2018, See the Abstract. (Year: 2018).*
(Continued)

*Primary Examiner* — Anca Eoff
*Assistant Examiner* — Monique M Wills
(74) *Attorney, Agent, or Firm* — Andrew M. Metrailer; Conley Rose, P.C.

(57) ABSTRACT

A high voltage aqueous battery includes a cathode comprising a cathode electroactive material, an anode comprising an anode electroactive material, a catholyte solution in contact with the cathode, and a polymerized anolyte solution in contact with the anode. The catholyte solution can be polymerized, and an optional separator can be used between the anolyte and the catholyte.

35 Claims, 21 Drawing Sheets

Related U.S. Application Data on Jul. 23, 2019, provisional application No. 62/867,959, filed on Jun. 28, 2019.

(51) Int. Cl.

| | |
|---|---|
| *H01M 4/46* | (2006.01) |
| *H01M 4/50* | (2010.01) |
| *H01M 4/62* | (2006.01) |
| *H01M 4/66* | (2006.01) |
| *H01M 10/24* | (2006.01) |
| *H01M 10/26* | (2006.01) |
| *H01M 4/02* | (2006.01) |

(52) U.S. Cl.
CPC ........... *H01M 4/661* (2013.01); *H01M 10/24* (2013.01); *H01M 10/26* (2013.01); *H01M 2004/027* (2013.01); *H01M 2300/0002* (2013.01)

(56) References Cited

U.S. PATENT DOCUMENTS

| | | | | |
|---|---|---|---|---|
| 2011/0014524 A1* | 1/2011 | Skotheim | .......... | H01M 10/4235 |
| | | | | 429/231.95 |
| 2011/0269007 A1* | 11/2011 | Visco | .................... | H01M 4/582 |
| | | | | 429/118 |
| 2013/0065122 A1 | 3/2013 | Chiang et al. | | |
| 2014/0170465 A1* | 6/2014 | Visco | .................. | H01M 50/449 |
| | | | | 429/144 |
| 2015/0333353 A1* | 11/2015 | Yazami | .................. | H01M 8/188 |
| | | | | 429/485 |
| 2017/0098823 A1 | 4/2017 | Yushin et al. | | |
| 2019/0190026 A1* | 6/2019 | Jeong | .................... | H01M 4/583 |

FOREIGN PATENT DOCUMENTS

| | | |
|---|---|---|
| WO | 2018102866 A1 | 6/2018 |
| WO | 2018221309 A1 | 12/2018 |
| WO | 2019023546 A2 | 1/2019 |
| WO | 2020264375 A1 | 12/2020 |

OTHER PUBLICATIONS

International Search Report and Written Opinion, dated Sep. 30, 2020, PCT/US2020/039927, filed on Jun. 26, 2020.

Yadav, Gautam G., et al., entitled, "Going beyond Intercalation Capacity of Aqueous Batteries by Exploiting Conversion Reactions of Mn and Zn electrodes for Energy-Dense Applications," Adv. Energy Mater. 2019, 1902270.

Yadav, Gautam G., et al., entitled, "Breaking the 2V barrier in Aqueous Zinc Chemistry: Creating 2.45V and 2.8V $MnO_2$—Zn aqueous batteries," The CUNY Energy Institute at the City College of New York, Department of Chemical Engineering.

International Preliminary Report on Patentability, dated Jan. 6, 2022, PCT/US2020/039927, filed on Jun. 26, 2020.

First Office Action dated Jan. 11, 2024, China Application No. 202080059100.5 filed Feb. 21, 2022.

First Examination Report dated Feb. 45, 2024, India Application No. 202117060724 filed Dec. 24, 2021.

* cited by examiner

HIGH VOLTAGE BATTERIES USING GELLED ELECTROLYTE

CROSS-REFERENCE TO RELATED APPLICATIONS

This application is a filing under 35 U.S.C. 371 as the National Stage of International Application No. PCT/US2020/039927, filed on Jun. 26, 2020 and entitled, "HIGH VOLTAGE BATTERIES USING GELLED ELECTROLYTE," which claims priority to and claims the benefit of: 1) U.S. Provisional Application No. 62/867,959, filed on Jun. 28, 2019, and entitled "Membrane-Less High Voltage Aqueous Manganese Dioxide Battery," 2) U.S. Provisional Application No. 62/877,528, filed on Jul. 23, 2019, and entitled "High Voltage MnO2|Zn and MnO2|Al Battery Using Permanganate and Gelled Alkaline Electrolyte," and 3) U.S. Provisional Application No. 62/895,706, filed on Sep. 4, 2019, and entitled "Complete Solid State High Voltage Aqueous Battery with High Ionic Conductivity," all three of which are incorporated herein by reference in their entirety for all purposes.

STATEMENT REGARDING GOVERNMENTALLY SPONSORED RESEARCH OR DEVELOPMENT

Not applicable.

BACKGROUND

Aqueous batteries containing manganese dioxide as the cathode active material are ubiquitous in the modern world. It is widely marketed as a primary battery when paired with a zinc anode for use in household electronics, camera batteries, video game controller batteries, etc. The open circuit potential of these batteries are usually between 1.5-1.6V because of the use of alkaline electrolyte. Batteries containing acidic or neutral electrolyte are also marketed as Leclanche-type with the open circuit potential in a similar range as that of the alkaline battery.

Other batteries can compete with aqueous batteries. For example, lithium (Li)-ion batteries dominate the storage landscape for almost all types of applications. Lead acid batteries still compete in some niche markets and in developing countries because of its low cost, however, these are extremely toxic. Li-ion batteries greatest asset has been its high voltage, which has allowed it to be applied for mobile electronics to electric cars. However, it does contain elements like Li and cobalt (Co) which are known to be geopolitically very sensitive elements and have a very high cost. Cobalt also has ethical issues surrounding its toxic effect on miners and their families. Li-ion batteries also seem to have hit its practical intercalation limit, so there cannot be much gain in energy density from these batteries anymore.

SUMMARY

In some embodiments, a high voltage aqueous battery includes a cathode comprising a cathode electroactive material, an anode comprising an anode electroactive material, a catholyte solution in contact with the cathode, and a polymerized anolyte solution in contact with the anode. The catholyte solution can be polymerized, and an optional separator can be used between the anolyte and the catholyte.

In some embodiments, a high voltage aqueous battery comprises a cathode comprising a manganese dioxide, a spinel manganese oxide ($Mn_3O_4$), or a manganese oxide (MnO), an anode comprising zinc, aluminum, magnesium, or iron, a polymerized catholyte solution in contact with the cathode, and a polymerized anolyte solution in contact with the anode.

In some embodiments, a high voltage aqueous battery comprises a cathode comprising lead oxide ($PbO_2$), an anode comprising zinc, aluminum, magnesium or iron, a polymerized catholyte solution in contact with the cathode, and a polymerized anolyte solution in contact with the anode.

These and other features will be more clearly understood from the following detailed description taken in conjunction with the accompanying claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
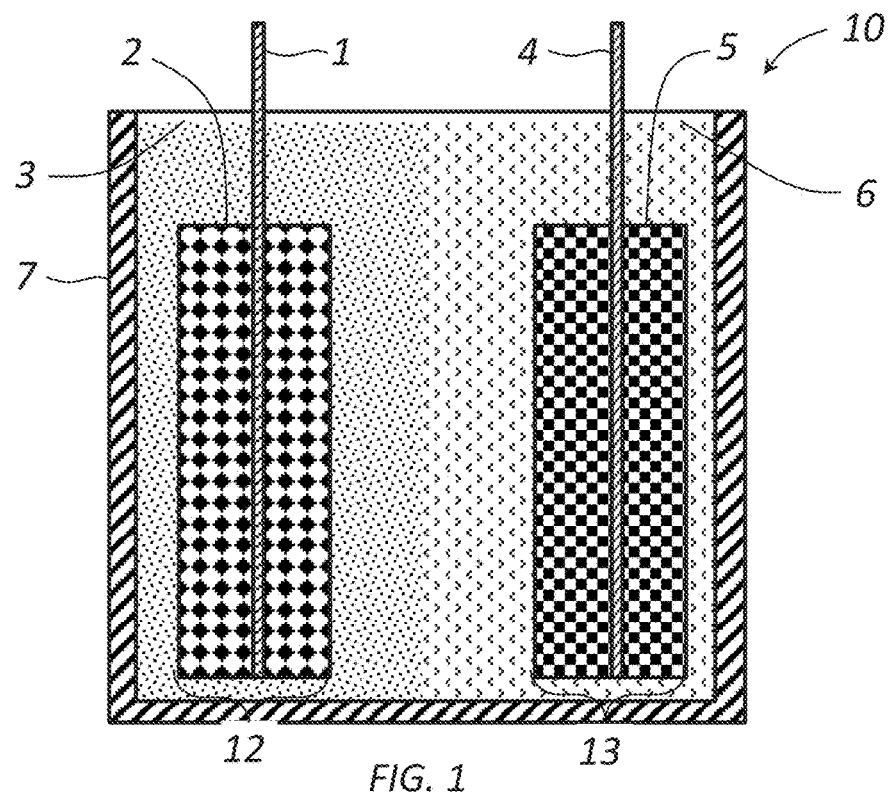
FIG. 1 is a schematic cross sectional view of a battery according to some embodiments.

In this disclosure, the terms "negative electrode" and "anode" are both used to mean "negative electrode." Likewise, the terms "positive electrode" and "cathode" are both used to mean "positive electrode." Reference to an "electrode" alone can refer to the anode, cathode, or both. Reference to the term "primary battery" (e.g., "primary battery," "primary electrochemical cell," or "primary cell"), refers to a cell or battery that after a single discharge is disposed of and replaced. Reference to the term "secondary battery" (e.g., "secondary battery," "secondary electrochemical cell," or "secondary cell"), refers to a cell or battery that can be recharged one or more times and reused. As used herein, a catholyte refers to an electrolyte solution in contact with the cathode without being in direct contact with the anode, and an "anolyte" refers to an electrolyte solution in contact with the anode without being in direct contact with the cathode.

The alkaline battery is widely used because of its superior storage properties and high ionic conductivity compared to acidic or neutral electrolyte. However, these batteries are used only once and then discarded because of the inactivity of its raw materials. Also, the energy extracted from these batteries can become low through use because the nominal voltage at which the capacity is extracted is around 1.1 to 1.2V. These characteristics curtail the use of this cheap, safe, and nonflammable and environmentally chemistry to small scale applications. If the voltage of the battery can be increased, a high fraction of the theoretical capacity of the raw materials can be accessed reversibly many times. If the cost of the battery can still be kept low, then this would represent a significant improvement in the field of energy storage systems as it would open the use of manganese dioxide-zinc batteries for use in applications that can have a larger impact on human life like grid storage applications, home power backup, use in mobile electronics, etc.

In some embodiments, a high voltage aqueous battery is disclosed, where manganese oxides ($MnO_2$), and in some embodiments lead oxide ($PbO_2$), is the primary cathode active material. The anode in this high voltage battery can be zinc (Zn), aluminum (Al), magnesium (Mg), and/or iron (Fe) active materials. The high voltage in the battery can be achieved by maintaining different pHs in the cathode and anode compartment of the battery, where the cathode is usually in acidic to neutral solutions and the anode can be in basic solution. In some embodiments, the high voltage aspect of the innovation can be achieved by polymerizing the alkaline electrolyte on the anode side and using an electrolyte comprising a permanganate on the cathode side. The resulting battery can be a stationary high voltage (2.8-4V) membrane-less aqueous battery containing manganese dioxide as the cathode. No flow or flow-assist condition is required for this battery as well. The manganese dioxide disclosed in this patent application can achieve 80-100% of its one electron (308 mAh/g) and two electron (617 mAh/g) capacity, respectively.

In some embodiments, the battery can be a complete solid state high voltage aqueous battery, which can deliver energy at a higher voltage than any battery that is currently available in the market. In this embodiment, the cathode can comprise manganese dioxide ($MnO_2$) or lead oxide ($PbO_2$) as the cathode active material, and the anode can comprise zinc (Zn), aluminum (Al), magnesium (Mg), and/or iron (Fe) as the anode active material. The high voltage in this battery can be achieved by maintaining different pHs in the cathode and anode compartment of the battery, where the cathode is usually in acidic to neutral solutions, while the anode is in basic/alkaline solution. The complete solid state aspect can be achieved by polymerizing both the cathode and anode electrolytes. The gelling of the electrolytes can result in a decrease in the ionic conductivity, which can be compensated for by increasing the ionic conductivity in the system by adding ammonium salts to the cathode electrolyte and potassium salts to the anode electrolyte. Better voltage characteristics can also be achieved by using additional dopants on the cathode electrode and/or electrolyte. This is the first disclosure of a fully solid state $MnO_2|Zn$, $MnO_2|Al$, $MnO_2|Mg$ and $MnO_2|Fe$ and $PbO_2|Zn$, $PbO_2|Al$, $PbO_2|Mg$ and $PbO_2|Fe$ high voltage aqueous battery (HiVAB), where potentials between 2.5 to 4V are seen for a $MnO_2|Zn$ system and potentials of ~3V are seen for a $PbO_2|Zn$ system. The manganese dioxide disclosed in this patent application can achieve 80-100% of its one electron (308 mAh/g) and two electron (617 mAh/g) capacity, respectively. Other forms of manganese oxides can also be used as the cathode like spinel manganese oxide ($Mn_3O_4$, $LiMn_2O_4$, and/or $ZnMn_2O_4$) and manganese oxide (MnO).

In some embodiments, a high voltage aqueous manganese dioxide battery with the ability to access its theoretical one electron (308 mAh/g) and two electron (617 mAh/g) capacity is provided. The high voltage can be achieved by creating a dual electrolyte battery, where the cathode is in acidic or near neutral electrolyte, while the anode is in basic electrolyte. The batteries can be constructed in several different manners. In some embodiments, the cathode can have a liquid catholyte comprising of acidic or neutral solution, and the anode can be in contact with an anolyte that is a polymerized or gelled electrolyte. The use of a separator with this type of battery is optional, and in some embodiments, the separator is not present between the catholyte and the anolyte. In some embodiments, the battery can comprise a liquid catholyte and a polymerized or gelled anolyte with a separator disposed between the catholyte and anolyte. In some embodiments, both the catholyte and the anolyte can be polymerized or gelled, and a separator may not be placed between the catholyte and the anolyte. In still other embodiments, both the catholyte and the anolyte can be polymerized or gelled and a separator can be disposed between the catholyte and the anolyte. Each of these embodiments is described in more detail herein.

Figure 2:
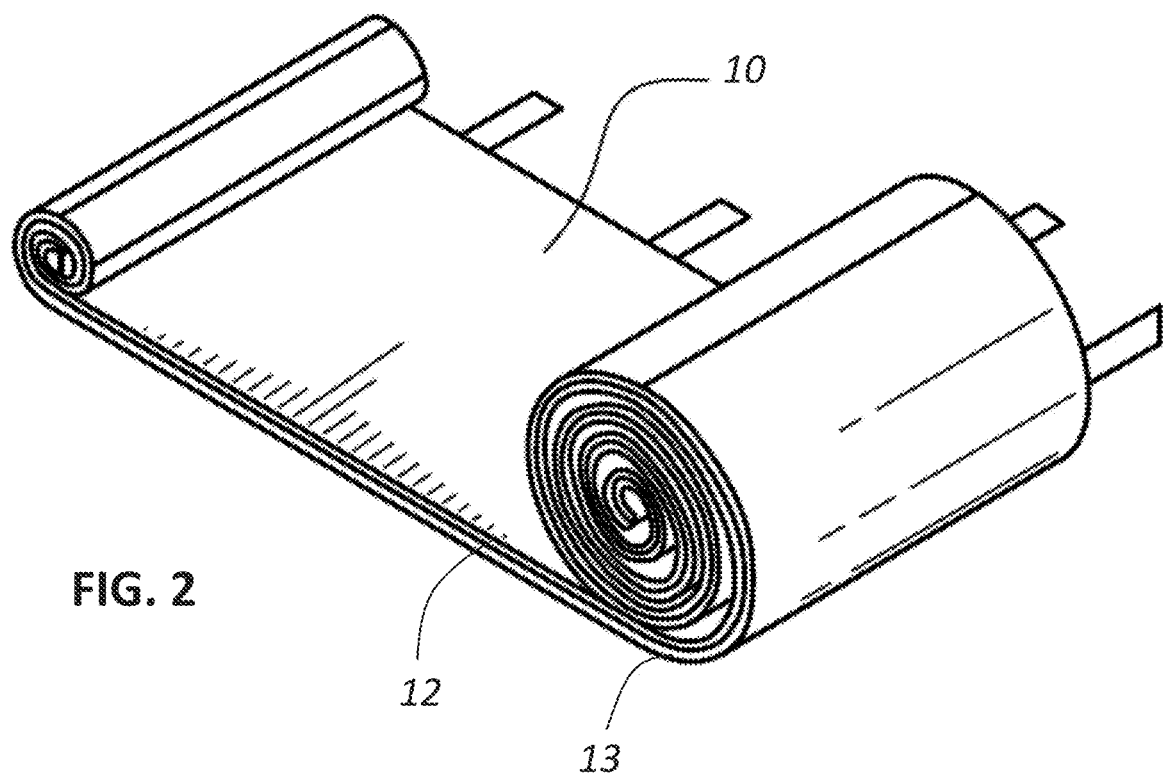
FIG. 2 is a perspective view of the electrodes of a cylindrical or jelly roll battery according to some embodiments.

Referring to FIG. 1, a battery 10 can have a housing 7, a cathode 12, which can include a cathode current collector 1 and a cathode material 2, and an anode 13. In some embodiments, the anode 13 can comprise an anode current collector 4, and an anode material 5. It is noted that the scale of the components in FIG. 1 may not be exact as the features are illustrates to clearly show the electrolyte around the anode 13 and the cathode 12. FIG. 1 shows a prismatic battery arrangement having a single anode 13 and cathode 12. In another embodiment, the battery can be a cylindrical battery (e.g., as shown in FIG. 2) having the electrodes arranged concentrically or in a rolled configuration in which the anode and cathode are layered and then rolled to form a jelly roll configuration. The cathode current collector 1 and cathode material 2 are collectively called either the cathode 12 or the positive electrode 12, as shown in FIG. 2. Similarly, the anode material 5 with the optional anode current collector 4 can be collectively called either the anode 13 or the negative electrode 13. A catholyte 3 can be in contact with the cathode 12, and an anolyte 6 can be in contact with the anode 13. As described in more detail herein, the catholyte 3 and/or the anolyte 6 can be polymerized or gelled to prevent mixing between the two electrolyte solutions.

In some embodiments, the battery 10 can comprise one or more cathodes 12 and one or more anodes 13. When a plurality of anodes 13 and/or a plurality of cathodes 12 are present, the electrodes can be configured in a layered configuration such that the electrodes alternate (e.g., anode, cathode, anode, etc.). Any number of anodes 13 and/or cathodes 12 can be present to provide a desired capacity and/or output voltage. In the jellyroll configuration, the battery 10 may only have one cathode 12 and one anode 13 in a rolled configuration such that a cross section of the battery 10 includes a layered configuration of alternating electrodes.

In an embodiment, housing 7 comprises a molded box or container that is generally non-reactive with respect to the electrolyte solutions in the battery 10, including the catholyte 3 and the anolyte 6. In an embodiment, the housing 7 comprises a polypropylene molded box, an acrylic polymer molded box, or the like.

The cathode 12 can comprise a mixture of components including an electrochemically active material, a binder, a conductive material, and/or one or more additional components that can serve to improve the lifespan, rechargeability, and electrochemical properties of the cathode 12. The cathode can comprise an active cathode material 2 (e.g., an electroactive material). Suitable cathode materials 2 can include, but are not limited to, manganese dioxide, copper manganese oxide, hausmannite, manganese oxide, copper intercalated bismuth birnessite, birnessite, todokorite, ramsdellite, pyrolusite, pyrochroite, lead, lead hydroxide, lead oxide, or any combination thereof. The electroactive component in the cathode material 2 can be between 1 and 99 wt. % of the weight of the cathode material 2, and the conductive additive can be between 1 and 99 wt. %.

In some embodiments, the active cathode material can based on one or many polymorphs of $MnO_2$, including electrolytic (EMD), $\alpha$-$MnO_2$, $\beta$-$MnO_2$, $\gamma$-$MnO_2$, $\delta$-$MnO_2$, $\varepsilon$-$MnO_2$, or $\lambda$-$MnO_2$. Other forms of $MnO_2$ can also be present such as pyrolusite, birnessite, ramsdellite, hollandite, romanechite, todorkite, lithiophorite, chalcophanite, sodium or potassium rich birnessite, cryptomelane, buserite, manganese oxyhydroxide (MnOOH), $\alpha$-MnOOH, $\gamma$-MnOOH, $\beta$-MnOOH, manganese hydroxide $[Mn(OH)_2]$, partially or fully protonated manganese dioxide, $Mn_3O_4$, $Mn_2O_3$, bixbyite, MnO, lithiated manganese dioxide ($LiMn_2O_4$), $CuMn_2O_4$, zinc manganese dioxide, or any combination therof. In general the cycled form of manganese dioxide in the cathode can have a layered configuration, which in some embodiment can comprise $\delta$-$MnO_2$ that is interchangeably referred to as birnessite. If non-birnessite polymorphic forms of manganese dioxide are used, these can be converted to birnessite in-situ by one or more conditioning cycles as described in more details below. For example, a full or partial discharge to the end of the $MnO_2$ second electron stage (e.g., between about 20% to about 100% of the $2^{nd}$ electron capacity of the cathode) may be performed and subsequently recharging back to its $Mn^{4+}$ state, resulting in birnessite-phase manganese dioxide.

The addition of a conductive additive such as conductive carbon enables high loadings of an electroactive material in the cathode material, resulting in high volumetric and gravimetric energy density. The conductive additive can be present in a concentration between about 1-30 wt. %. In some embodiments, the conductive additive can comprise graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof. Higher loadings of the electroactive material in the cathode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades(examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P , SUPER P Li, carbon black (examples include Ketjenblack EC-300J, Ketjenblack EC-600JD, Ketjenblack EC-600JD powder), acetylene black, carbon nanotubes (single or multi-walled), Zenyatta graphite, and combinations thereof. When the electroactive material comprises manganese, the birnessite discharge reaction comprises a dissolution-precipitation reaction where $Mn^{3+}$ ions become soluble and precipitate out on the conductive carbon as $Mn^{2+}$. This second electron process can involve the formation of a non-conductive manganese hydroxide $[Mn(OH)_2]$ layer on the conductive graphite.

In some embodiments, the conductive additive can have a particle size range from about 1 to about 50 microns, or between about 2 and about 30 microns, or between about 5 and about 15 microns. In an embodiment, the conductive additive can include expanded graphite having a particle size range from about 10 to about 50 microns, or from about 20 to about 30 microns. In some embodiments, the mass ratio of graphite to the conductive additive can range from about 5:1 to about 50:1, or from about 7:1 to about 28:1. The total carbon mass percentage in the cathode paste can range from about 5% to about 99% or between about 10% to about 80%. In some embodiments, the electroactive component in the cathode material 2 can be between 1 and 99 wt. % of the weight of the cathode material 2, and the conductive additive can be between 1 and 99 wt. %.

The cathode material 2 can also comprise a conductive component. The addition of a conductive component such as metal additives to the cathode material may be accomplished by addition of one or more metal powders such as nickel powder to the cathode mixture. The conductive metal component can be present in a concentration of between about 0-30 wt. %. The conductive metal component may be, for example, nickel, copper, silver, gold, tin, cobalt, antimony, brass, bronze, aluminum, calcium, iron, or platinum. In one embodiment, the conductive metal component is a powder. In some embodiments, the conductive component can be added as an oxide and/or salt. For example, the conductive component can be cobalt oxide, cobalt hydroxide, lead oxide, lead hydroxide, or a combination thereof. In some embodiments, a second conductive metal component is added to act as a supportive conductive backbone for the first and second electron reactions to take place. The second electron reaction has a dissolution-precipitation reaction where $Mn^{3+}$ ions become soluble in the electrolyte and precipitate out on the graphite resulting in an electrochemical reaction and the formation of manganese hydroxide [$Mn(OH)_2$] which is non-conductive. This ultimately results in a capacity fade in subsequent cycles. Suitable second component include transition metals like Ni, Co, Fe, Ti and metals like Ag, Au, Al, Ca. Oxides and salts of such metals are also suitable. Transition metals like Co can also help in reducing the solubility of $Mn^{3+}$ ions. Such conductive metal components may be incorporated into the electrode by chemical means or by physical means (e.g. ball milling, mortar/pestle, spex mixture). An example of such an electrode comprises 5-95% birnessite, 5-95% conductive carbon, 0-50% second conductive metal component, and 1-10% binder.

In some embodiments, a binder can be used with the cathode material 2. The binder can be present in a concentration of between about 0-10 wt. %. In some embodiments, the binder comprises water-soluble cellulose-based hydrogels, which can be used as thickeners and strong binders, and have been cross-linked with good mechanical strength and with conductive polymers. The binder may also be a cellulose film sold as cellophane. The binders can be made by physically cross-linking the water-soluble cellulose-based hydrogels with a polymer through repeated cooling and thawing cycles. In some embodiments, the binder can comprise a 0-10 wt. % carboxymethyl cellulose (CMC) solution cross-linked with 0-10 wt. % polyvinyl alcohol (PVA) on an equal volume basis. The binder, compared to the traditionally-used TEFLON®, shows superior performance. TEFLON® is a very resistive material, but its use in the industry has been widespread due to its good rollable properties. This, however, does not rule out using TEFLON® as a binder. Mixtures of TEFLON® with the aqueous binder and some conductive carbon were used to create rollable binders. Using the aqueous-based binder helps in achieving a significant fraction of the two electron capacity with minimal capacity loss over many cycles. In some embodiments, the binder can be water-based, have superior water retention capabilities, adhesion properties, and help to maintain the conductivity relative to an identical cathode using a TEFLON® binder instead. Examples of hydrogels can include, but are not limited to, methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC). Examples of crosslinking polymers include polyvinyl alcohol, polyvinylacetate, polyaniline, polyvinylpyrrolidone, polyvinylidene fluoride and polypyrrole. In some embodiments, a 0-10 wt. % solution of water-cased cellulose hydrogen can be cross linked with a 0-10% wt solution of crosslinking polymers by, for example, repeated freeze/thaw cycles, radiation treatment or chemical agents (e.g. epichlorohydrin). The aqueous binder may be mixed with 0-5% TEFLON® to improve manufacturability.

The cathode material 2 can also comprise additional elements. The additional elements can be included in the cathode material including a bismuth compound and/or copper/copper compounds, which together allow improved galvanostatic battery cycling of the cathode. When present as birnessite, the copper and/or bismuth can be incorporated into the layered nanostructure of the birnessite. The resulting birnessite cathode material can exhibit improved cycling and long term performance with the copper and bismuth incorporated into the crystal and nanostructure of the birnessite.

The bismuth compound can be incorporated into the cathode 12 as an inorganic or organic salt of bismuth (oxidation states 5, 4, 3, 2, or 1), as a bismuth oxide, or as bismuth metal (i.e. elemental bismuth). The bismuth compound can be present in the cathode material at a concentration between about 1-20 wt. % of the weight of the cathode material 2. Examples of inorganic bismuth compounds include bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl)bismuth, dichlordiphenyl(p-tolyl)bismuth, triphenylbismuth, or any combination thereof.

The copper compound can be incorporated into the cathode 12 as an organic or inorganic salt of copper (oxidation states 1,2,3 or 4), as a copper oxide, or as copper metal (i.e., elemental copper). The copper compound can be present in a concentration between about 1-70 wt. % of the weight of the cathode material 2. In some embodiments, the copper compound is present in a concentration between about 5-50 wt. % of the weight of the cathode material 2. In other embodiments, the copper compound is present in a concentration between about 10-50 wt. % of the weight of the cathode material 2. In yet other embodiments, the copper compound is present in a concentration between about 5-20 wt. % of the weight of the cathode material 2. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is to alter the oxidation and reduction voltages of bismuth. This results in a cathode with full reversibility during galvanostatic cycling, as compared to a bismuth-modified $MnO_2$ which cannot withstand galvanostatic cycling as well.

The cathodes 12 can be produced using methods implementable in large-scale manufacturing. For a $MnO_2$ cathode, the cathode 12 can be capable of delivering the full second electron capacity of the $MnO_2$. Excellent rechargeable performance can be achieved for both low and high loadings of $MnO_2$ in the mixed material, allowing the cell/battery to achieve very high practical energy densities. In some embodiments, the cathode material can comprises 2-30% wt conductive carbon, 0-30% conductive metal additive, 1-70% wt. copper compound, 1-20% wt bismuth compound, 0-10 wt. % binder and birnessite or EMD. In another embodiment the cathode material comprises 2-30 wt. % conductive carbon, 0-30% conductive metal additive, 1-20% wt bismuth compound, 0-10 wt. % binder and birnessite or EMD. In one embodiment, the cathode material consists essentially of 2-30 wt. % conductive carbon, 0-30% conductive metal additive, 1-70% wt. copper compound, 1-20 wt. % bismuth compound, 0-10% wt binder and the balance birnessite or EMD. In another embodiment the cathode material consists essentially of 2-30 wt. % conductive carbon, 0-30% conductive metal additive, 1-20% wt bismuth compound, 0-10 wt. % binder and the balance birnessite or EMD.

The resulting cathode may have a porosity in the range of 20%-85% as determined by mercury infiltration porosimetry. The porosity can be measured according to ASTM D4284-12 "Standard Test Method for Determining Pore Volume Distribution of Catalysts and Catalyst Carriers by Mercury Intrusion Porosimetry."

The cathode material 2 can be formed on a cathode current collector 1 formed from a conductive material that serves as an electrical connection between the cathode material and an external electrical connection or connections. In some embodiments, the cathode current collector 1 can be, for example, carbon, lead, nickel, steel (e.g., stainless steel, etc.), nickel-coated steel, nickel plated copper, tin-coated steel, copper plated nickel, silver coated copper, copper, magnesium, aluminum, tin, iron, platinum, silver, gold, titanium, bismuth, titanium, half nickel and half copper, or any combination thereof. In some embodiments, the current collector 1 can comprise a carbon felt or conductive polymer mesh. The cathode current collector may be formed into a mesh (e.g., an expanded mesh, woven mesh, etc.), perforated metal, foam, foil, felt, fibrous, porous block architecture, perforated foil, wire screen, a wrapped assembly, or any combination thereof. In some embodiments, the current collector can be formed into or form a part of a pocket assembly, where the pocket can hold the cathode material 2 within the current collector 1. A tab (e.g., a portion of the cathode current collector 1 extending outside of the cathode material 2 as shown at the top of the cathode 12 in FIG. 1) can be coupled to the current collector to provide an electrical connection between an external source and the current collector.

The cathode material 2 can be pressed onto the cathode current collector 1 to form the cathode 12. For example, the cathode material 2 can be adhered to the cathode current collector 1 by pressing at, for example, a pressure between 1,000 psi and 20,000 psi (between $6.9 \times 10^6$ and $1.4 \times 10^8$ Pascals). The cathode material 2 may be adhered to the cathode current collector 1 as a paste. A tab of the cathode current collector 1, when present, can extend outside of the housing 7 to form the current collector tab.

The catholyte 3 can be disposed in the housing 10 in contact with the cathode material 2 and the anolyte 6. In the embodiment shown in FIG. 1, the anolyte 6 can be polymerized or gelled, and the catholyte 3 can be a liquid. The polymerization of the anolyte 6 can prevent mixing between the catholyte 3 and the anolyte 6 even when the catholyte 3 is a liquid.

In some embodiments, the catholyte can comprise an acid such as a mineral acid (e.g., hydrochloric acid, nitric acid, sulfuric acid, etc.). For acid catholyte compositions, the acid concentration can be between about 0 M and about 16 M. In some embodiments, the catholyte solution can comprise a solution comprising potassium permanganate, sodium permanganate, lithium permanganate, calcium permanganate, manganese sulfate, manganese chloride, manganese nitrate, manganese perchlorate, manganese acetate, manganese triflate, manganese carbonate, manganese oxalate, manganese fluorosilicate, manganese ferrocyanide, manganese bromide, magnesium sulfate, zinc sulfate, zinc triflate, zinc acetate, zinc nitrate, bismuth chloride, bismuth nitrate, nitric acid, sulfuric acid, hydrochloric acid, sodium sulfate, potassium sulfate, sodium hydroxide, potassium hydroxide, titanium sulfate, titanium chloride, lithium nitrate, lithium chloride, lithium bromide, lithium bicarbonate, lithium acetate, lithium sulfate, lithium nitrite, lithium hydroxide, lithium perchlorate, lithium oxalate, lithium fluoride, lithium carbonate, lithium sulfate, lithium bromate, or any combination thereof. For example, the cathode solution can comprise manganese sulfate mixed with sulfuric acid or potassium permanganate mixed with sulfuric acid. Other dopants to this solution can be zinc sulfate, lead sulfate, titanium disulfide, titanium sulfate hydrate, silver sulfate, cobalt sulfate, and nickel sulfate. The catholyte can be an acidic or neutral solution, and the pH of the catholyte can be between −1.2 and 7. The catholyte can be used in conditions having temperatures ranging between 0 and 200° C.

In some embodiments, the catholyte can comprise a permanganate. Permanganates have a high positive potential. This can allow the overall cell potential to be increased within the battery 10. When present, the permanganate can be present in a molar ratio of an acid (e.g., a mineral acid such a hydrochloric acid, sulfuric acid, etc.) to permanganate of between about 1:1 to about 1:6, or between about 1:2 to about 1:4, or about 1:3, though the exact amount can vary based on the expected operation conditions of the battery 10. The concentration of the permanganate (e.g., potassium permanganate or a salt of permanganate, etc.) can be greater than 0 and less than or equal to 5 M. In some embodiments, the catholyte solution comprises sulfuric acid, hydrochloric acid or nitric acid at a concentration greater than 0 and less than or equal to 16M. The use of a permanganate can be advantageous for creating a high voltage battery such that when the use of a catholyte with permanganates is combined with a very negative anode potential, the resulting batter can have an voltage of approximately 2.8V when the cathode and anode are $MnO_2|Zn$ and a voltage of approximately 4V when the cathode and anode are $MnO_2|Al$.

In some embodiments, the electroactive component of the anode material 5 can comprise zinc, aluminum, magnesium, iron, or any combination thereof. In some embodiments, the anode material 5 can comprise iron oxide, iron hydroxide, bismuth oxide, bismuth, indium oxide, indium hydroxide, indium, copper, copper oxide, copper hydroxide, a manganese oxide (e.g., $Mn_3O_4$, $Mn_2O_3$, $MnO_2$, combinations thereof, etc.), or combinations thereof. In alkaline electrolytes, the anode material 5 can have relatively negative reduction potential that allow the voltage in the battery to be relatively high. When the manganese dioxide is in acidic solution and the anode material 5 comprises zinc or aluminum in contact with a basic solution, a battery voltage of >2.4-4V can be achieved, which makes the battery equivalent or better to variations of lithium-ion, lithium metal, sodium-ion, sodium metal, potassium-ion, potassium metal, calcium-ion, calcium metal, magnesium metal and metal-sulfur chemistry, which are usually flammable, toxic, and very expensive.

In some embodiments, the anode material 5 can comprise zinc, which can be present as elemental zinc and/or zinc oxide. In some embodiments, the Zn anode mixture comprises Zn, zinc oxide (ZnO), an electronically conductive material, and a binder. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material. Additional elements that can be in the anode in addition to the zinc or in place of the zinc include, but are not limited to, lithium, aluminum, magnesium, iron, cadmium, or any combination thereof, where each element can be present in amounts that are the same or similar to that of the zinc described herein.

In some embodiments, the anode material 5 can comprise zinc oxide (ZnO), which may be present in an amount of from about 5 wt. % to about 20 wt. %, alternatively from about 5 wt. % to about 15 wt. %, or alternatively from about 5 wt. % to about 10 wt. %, based on the total weight of anode material. As will be appreciated by one of skill in the art, and with the help of this disclosure, the purpose of the ZnO in the anode mixture is to provide a source of Zn during the recharging steps, and the zinc present can be converted between zinc and zinc oxide during charging and discharging phases.

In an embodiment, an electrically conductive material may be optionally present in the anode material in an amount of from about 5 wt. % to about 20 wt. %, alternatively from about 5 wt. % to about 15 wt. %, or alternatively from about 5 wt. % to about 10 wt. %, based on the total weight of the anode material. As will be appreciated by one of skill in the art, and with the help of this disclosure, the electrically conductive material can be used in the Zn anode mixture as a conducting agent, e.g., to enhance the overall electric conductivity of the Zn anode mixture. Non-limiting examples of electrically conductive material suitable for use can include any of the conductive carbons described herein such as carbon, graphite, graphite powder, graphite powder flakes, graphite powder spheroids, carbon black, activated carbon, conductive carbon, amorphous carbon, glassy carbon, and the like, or combinations thereof. The conductive material can also comprise any of the conductive carbon materials described with respect to the cathode material including, but not limited to, acetylene black, single walled carbon nanotubes, multi-walled carbon nanotubes, graphene, graphyne, or any combinations thereof The anode material 5 may also comprise a binder. Generally, a binder functions to hold the electroactive material particles (e.g., Zn used in anode, etc.) together and in contact with the current collector. The binder can be present in a concentration of 0-10 wt. %. The binders may comprise water-soluble cellulose-based hydrogels like methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose, and hydroxyethyl cellulose (HEC), which were used as thickeners and strong binders, and have been cross-linked with good mechanical strength and with conductive polymers like polyvinyl alcohol, polyvinylacetate, polyaniline, polyvinylpyrrolidone, polyvinylidene fluoride and polypyrrole. The binder may also be a cellulose film sold as cellophane. The binder may also be TEFLON®, which is a very resistive material, but its use in the industry has been widespread due to its good rollable properties. In some embodiments, the binder may be present in anode material in an amount of from about 2 wt. % to about 10 wt. %, alternatively from about 2 wt. % to about 7 wt. %, or alternatively from about 4 wt. % to about 6 wt. %, based on the total weight of the anode material.

In some embodiments, the anode material 5 can be used by itself without a separate anode current collector 4, though a tab or other electrical connection can still be provided to the anode material 5. In this embodiment, the anode material may have the form or architecture of a foil, a mesh, a perforated layer, a foam, a felt, or a powder.

In some embodiments, the anode 13 can comprise an optional anode current collector 4. The anode current collector 4 can be used with an anode 13, including any of those described with respect to the cathode 12. The anode material 5 can be pressed onto the anode current collector 4 to form the anode 13. For example, the anode material 5 can be adhered to the anode current collector 4 by pressing at, for example, a pressure between 1,000 psi and 20,000 psi (between $6.9 \times 10^6$ and $1.4 \times 10^8$ Pascals). The anode material 5 may be adhered to the anode current collector 4 as a paste. A tab of the anode current collector 4, when present, can extend outside of the device to form the current collector tab.

The high voltage battery can be achieved by polymerizing the anode electrolyte, which can allow the relatively expensive separator (e.g., an ion-selective membrane) that are useful to make a dual electrolyte battery work in liquid electrolyte systems to be removed. In some embodiments, the anolyte can be an alkaline electrolyte, while the catholyte can be an acidic or neutral solution. The alkaline electrolyte in the anolyte can be a hydroxide such as potassium hydroxide, sodium hydroxide, lithium hydroxide, ammonium hydroxide, cesium hydroxide, or any combination thereof. The resulting anolyte can have a pH greater than 7. In some embodiments, the pH of the anolyte can be greater than or equal to 10 and less than or equal to about 15.13.

In addition to a hydroxide, the anolyte can comprise additional components. In some embodiments, the alkaline electrolyte can have zinc oxide, potassium carbonate, potassium iodide and potassium fluoride as additives. When zinc compounds are present in the anolyte, the anolyte can comprise zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate, acrylic acid, N,N'-Methylenebisacrylamide, potassium persulfate, ammonium persulfate, sodium persulfate, or a combination thereof.

As described herein, the anolyte can be polymerized or gelled. The resulting anolyte can be in a semi-solid state that resists flowing within the battery. This can serve to limit or prevent any mixing between the anolyte and the catholyte. The anolyte can be polymerized using any suitable techniques. While a number of polymerization processes can be used, In some embodiments, a mixture of acrylic acid, N,N'-methylenebisacrylamide, and alkaline solution can be created at a temperature of around 0° C. Any additives can then be added to the solution. For example, zinc oxide, when used in the anolyte, can be dissolved in the alkaline solution after mixing the precursor components, where the zinc oxide can beneficial during the electrochemical cycling of the anode. To polymerize the resulting mixture an initiator such as potassium persulfate can be added to initiate the polymerization process and form a solid polymerized electrolyte. The resulting polymerized anolyte is stable and its interface can prevent the mixture of the catholyte and the anolyte to create a high voltage source.

The polymerization process can occur prior to the construction of the battery 10 or after the cell is constructed. In some embodiments, the anolyte can be polymerized and placed into a tray to form a sheet. Once polymerized, the sheet can be cut into a suitable size and shape and one or more layers can be used to form the anolyte in contact with the anode 13. In some embodiments, the anolyte can be formed as the polymerization mixture along with the initiator and the disposed in the battery 10 prior to the full polymerization of the anolyte 6. The anolyte 6 can then polymerize in situ within the battery 10.

As shown in FIG. 1, the battery 10 may not comprise a separator. The ability to form the battery 10 without a separator may allow for the overall cost of the battery to be reduced while having the same or similar performance to a battery with a separator.

Figure 3:
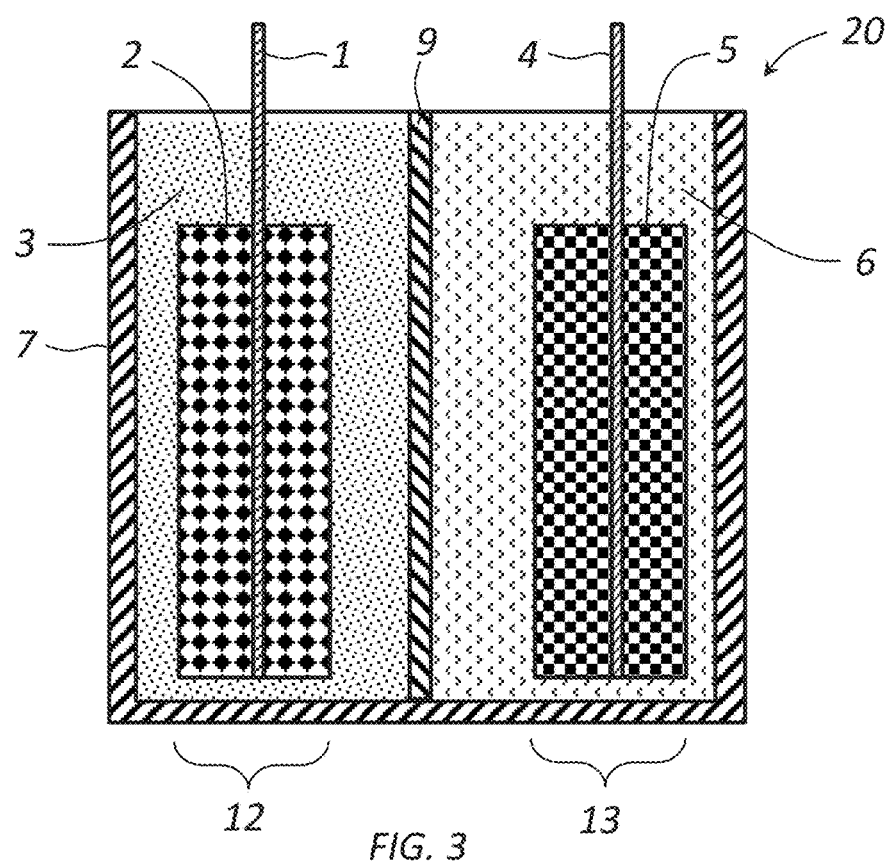
FIG. 3 is another schematic cross sectional view of a battery according to some embodiments.

In some embodiments, a separator can be disposed between the anode 13 and the cathode 12 when the electrodes are constructed into the battery. FIG. 3 illustrates an embodiment of a battery 20 that is similar to the battery 10 with the exception that the battery 20 can have a separator 9 disposed between the catholyte 3 and the anolyte 6. The remaining portions of the battery 20 can be the same as those described with respect to the battery 10 of FIG. 1. In this embodiment, the separator 9 may comprise one or more layers. Suitable layers can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified" refers to a material whose contact angle with water is less than 45°. In another embodiment, the contact angle with water is less than 30°. In yet another embodiment, the contact angle with water is less than 20°. The polyolefin may be modified by, for example, the addition of TRITON X100™ or oxygen plasma treatment. In some embodiments, the separator 9 can comprise a CELGARD® brand microporous separator. In an embodiment, the separator 9 can comprise a FS 2192 SG membrane, which is a polyolefin nonwoven membrane commercially available from Freudenberg, Germany. In some embodiments, the separator can comprise a lithium super ionic conductor (LISICON®), sodium super ionic conductions (NASICON), NAFION®, a bipolar membrane, water electrolysis membrane, a composite of polyvinyl alcohol and graphene oxide, polyvinyl alcohol, crosslinked polyvinyl alcohol, or a combination thereof.

While the separator 9 can comprise a variety of materials, the use of a polymerized or gelled anolyte 6 can allow for a relatively inexpensive separator 9 to be used. For example, the separator 9 can comprise CELLOPHANE®, polyvinyl alcohol, CELGARD®, a composite of polyvinyl alcohol and graphene oxide, crosslinked polyvinyl alcohol, PELLON®, a composite of carbon-polyvinyl alcohol is placed between the two electrolytes. Use of the separator 9 between the two electrolytes may help in improving the cycle life of the battery 20, but is not necessary in all embodiments.

Figure 4:
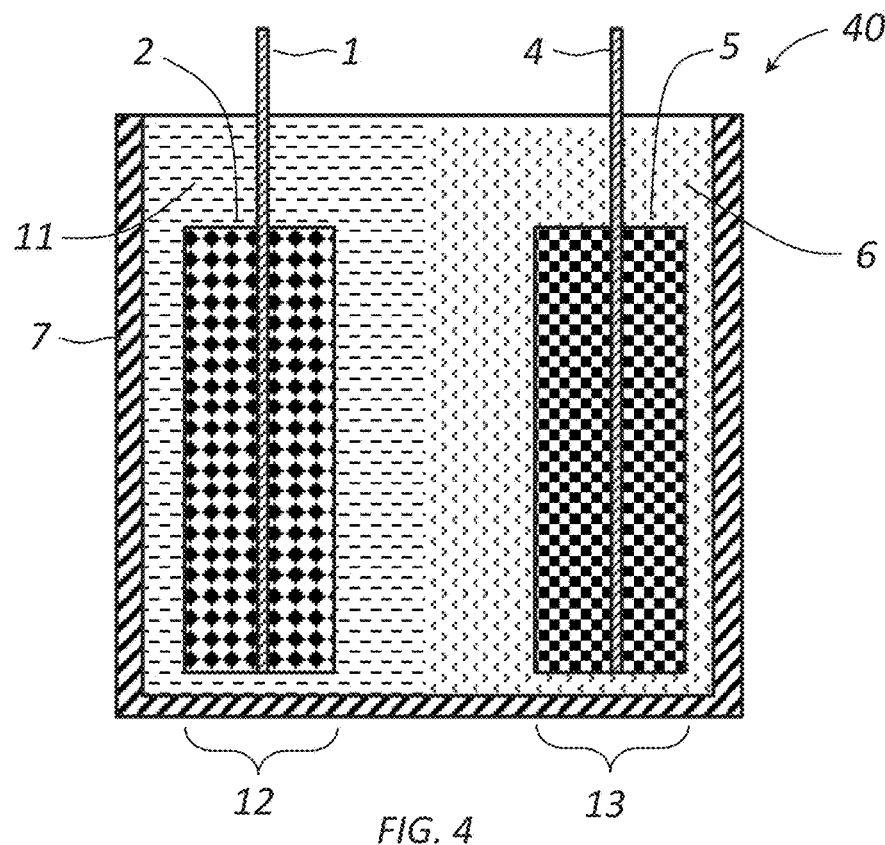
FIG. 4 is still another schematic cross sectional view of a battery according to some embodiments.

In some embodiments, both the catholyte and the anolyte can be polymerized or gelled. As shown in FIG. 4, a battery 40 can comprise a polymerized or gelled catholyte 11 and a polymerized or gelled anolyte 6 without a separator disposed between the catholyte 11 and the anolyte 6. The remaining portions of the battery 40 can be the same or similar to those described with respect to the battery 10 in FIG. 1, and like parts will not be redescribed in the sake of brevity.

In the battery 40, the catholyte 11 can comprise the same or similar components as those described with respect to the catholyte 3, including an acid or neutral electrolyte along with one or more optional additives. The resulting catholyte can then be polymerized to form a gelled electrolyte that can resist movement and mixing with the anolyte 6. The catholyte 11 can be polymerized using any suitable polymerization techniques for an acidic or neutral solution.

In some embodiments, the catholyte 11 can be polymerized by mixing the acidic or neutral solution with polyvinyl alcohol (PVA) to create a hydrogel. This gelled structure can be further treated with two to three thaw cycles, where the acidic-PVA hydrogel structure can be cooled to a temperature between −20° C. to 0° C. and then brought back to room temperature repeatedly. To improve the properties of the acidic hydrogel, a quinone-based compound like p-benzenediol and alizarin red S can be added to the mixture of PVA, acidic, or neural solution before the thaw steps. Any other suitable polymerization or gelling techniques or processes can also be used. Once gelled, the catholyte 11 and the anolyte 6 can be placed in contact within the housing 7 and used within the battery 40.

Figure 5:
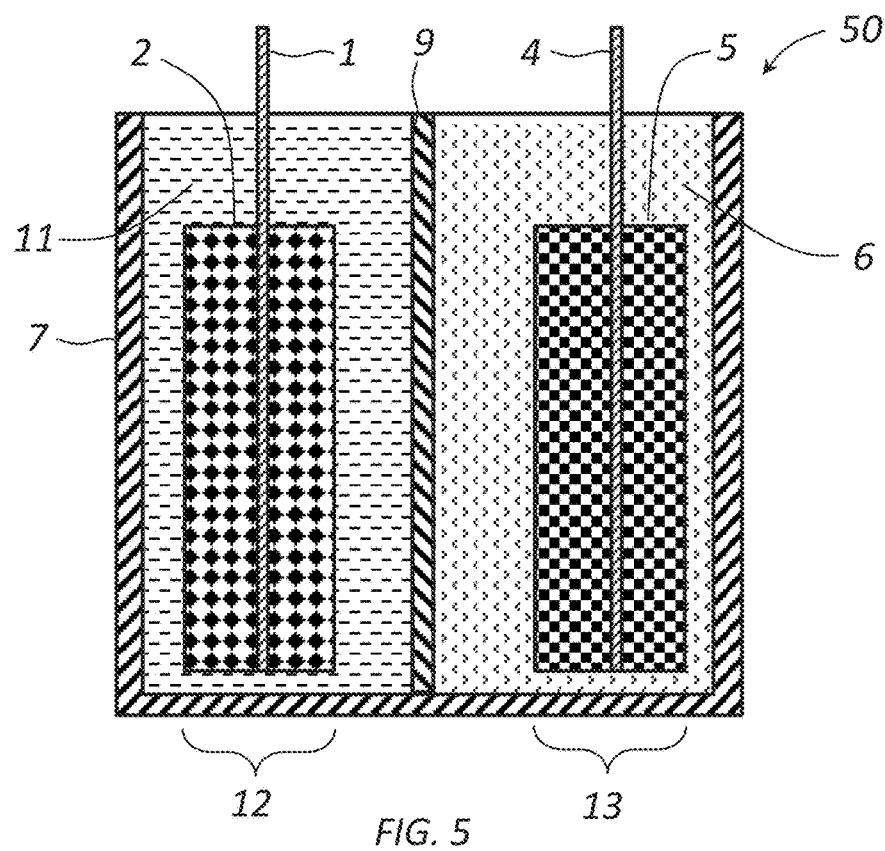
FIG. 5 is yet another schematic cross sectional view of a battery according to some embodiments.

FIG. 5 illustrates another embodiment of a battery 50 in which a polymerized or gelled catholyte 11 and a polymerized or gelled anolyte 6 can be separated by a separator 9. The remaining portions of the battery 50 can be the same or similar to those described with respect to the battery 10 in FIG. 1 and the battery 40 with respect to FIG. 4, and like parts will not be redescribed in the sake of brevity. As shown in FIG. 5, the separator 9 can be placed between the gelled catholyte 11 and the gelled anolyte 6. The separator 9 can comprise any of the separators described with respect to the separator 9 in FIG. 3. The use of the separator 9 in the battery 50 may serve to improve the cycle life of the battery 50.

In addition to the embodiments described above, the battery can be a complete solid state high voltage battery (SS-HiVAB). In some embodiments, a SS-HiVAB can deliver energy at a higher voltage than any comparable battery that is currently available in the market. In these embodiments, the cathode can comprise manganese dioxide ($MnO_2$) or lead oxide ($PbO_2$), and the anode can comprise zinc (Zn), aluminum (Al), magnesium (Mg), and/or iron (Fe). The high voltage can be achieved by maintaining different pHs in the cathode and anode compartment of the battery, where the cathode is usually in acidic to neutral solutions, while the anode is in basic/alkaline solution. The complete solid state aspect can be achieved by polymerizing both the cathode and anode electrolytes (e.g., the catholyte and the anolyte, respectively). The increase in ionic conductivity in the system can be achieved by adding ammonium salts to the cathode electrolyte and/or potassium salts to the anode electrolyte. Better voltage characteristics can also be achieved by using additional dopants on the cathode electrode and/or electrolyte. The resulting configurations can allow for a fully solid state $MnO_2|Zn$, $MnO_2|Al$, $MnO_2|Mg$ and $MnO_2|Fe$ and $PbO_2|Zn$, $PbO_2|Al$, $PbO_2|Mg$ and $PbO_2|Fe$ high voltage aqueous battery (HiVAB), where potentials between 2.5 to 34 are seen for a $MnO_2|Zn$ system and potentials of ~3V are seen for a $PbO_2|Zn$ system. The manganese dioxide disclosed in this patent application can achieve 80-100% of its one electron (308 mAh/g) and two electron (617 mAh/g) capacity, respectively. Other forms of manganese oxides can also be used as the cathode like spinel manganese oxide ($Mn_3O_4$, $LiMn_2O_4$, $ZnMn_2O_4$) and manganese oxide (MnO).

The disclosed SS-HiVAB can provide a very energy dense battery based on the theoretical capacities of $MnO_2$ and Zn. $MnO_2$ reacts acidic electrolyte with two electrons to deliver 617 mAh/g. However, one electron can also be cycled at 308 mAh/g. Both these capacity values of $MnO_2$ make it a very energy dense cathode. Compared to traditional Li-ion cathodes which have capacity values of 140-180 mAh/g usually cycled, the $MnO_2$ in the new SS-HiVAB can be cycled ~2-3.5 times more. Also, the carbon anode in Li-ion batteries have only 375 mAh/g theoretical capacity, while Zn in the new SS-HiVAB has 820 mAh/g based on 2e reactions. The high capacities of the cathode and anode coupled with the high voltage of 2.45-4V make these SS-HiVAB MnO$_2$|Zn much more energy dense than Li-ion batteries.

The batteries can comprise any of the cathode materials as described with respect to the batteries of FIGS. 1-5. Specifically, the batteries can comprise a cathode material comprising manganese dioxide (MnO$_2$) or lead oxide (PbO$_2$). The cathode material can also comprise any of the additives disclosed with respect to the cathode material in the batteries of FIGS. 1-5. For example, MnO$_2$ can exist in various polymorphic forms like α, δ, γ, β, λ, ε, and electrolytic manganese dioxide, all of which are described herein.

When the cathode material comprises MnO$_2$, the MnO$_2$ of the resulting batteries can be cycled at 100% of 308 mAh/g and 50-100% of 617 mAh/g. This can be achieved in acidic electrolyte because of the dissolution of Mn ions. MnO$_2$ is at Mn$^{4+}$ state and it reduces to Mn$^{2+}$ when it is discharge completely to 617 mAh/g. In alkaline electrolyte it is difficult to cycle the complete two electron capacity of 617 mAh/g because of the insolubility of Mn ions.

The cathode can comprise a cathode current collector and be formed using any of the materials, forms, and techniques as described with respect to FIGS. 1-5 herein.

Any of the catholyte compositions and additives described with respect to FIGS. 1-5 can also be used with the catholyte in the SS-HiVAB. The catholyte can be polymerized or gelled using any of the techniques described herein. For example, the catholyte can comprise potassium permanganate, sodium permanganate, lithium permanganate, calcium permanganate, manganese sulfate, manganese chloride, manganese nitrate, manganese perchlorate, manganese acetate, manganese triflate, manganese carbonate, manganese oxalate, manganese fluorosilicate, manganese ferrocyanide, manganese bromide, magnesium sulfate, ammonium chloride, ammonium sulfate, ammonium hydroxide, zinc sulfate, zinc triflate, zinc acetate, zinc nitrate, bismuth chloride, bismuth nitrate, nitric acid, sulfuric acid, hydrochloric acid, sodium sulfate, potassium sulfate, cobalt sulfate, lead sulfate, sodium hydroxide, potassium hydroxide, titanium sulfate, titanium chloride, lithium nitrate, lithium chloride, lithium bromide, lithium bicarbonate, lithium acetate, lithium sulfate, lithium nitrite, lithium hydroxide, lithium perchlorate, lithium oxalate, lithium fluoride, lithium carbonate, lithium sulfate, lithium bromate, polyvinyl alcohol, carboxymethyl cellulose, xanthum gum, carrageenan, acrylamide, potassium persulfate, sodium persulfate, ammonium persulfate, N,N'-Methylenebisacrylamide, or a combination thereof. In some embodiments, the catholyte solution can comprise manganese sulfate, ammonium chloride, ammonium sulfate, manganese acetate, potassium permanganate, and/or a salt of permanganate, where the additives can have a concentration between 0 and 10M. Depending on the type of manganese salts used voltage of the battery system can be different. For example, in manganese sulfate electrolyte the voltage of the SS-HiVAB is around 2.45-2.5V, while in potassium permanganate electrolyte the voltage of the SS-HiVAB is around 2.8-2.9V.

An acid can be added to these electrolytes to increase solubility of Mn ions, increase the ionic conductivity of the electrolyte, and adjust the pH to a desired value. The SS-HiVAB gelled catholyte can comprise sulfuric acid, hydrochloric acid, and/or nitric acid, and the acid can be present at a concentration between 0 and 16M in the catholyte. In some embodiments, the polymerized catholyte solution can comprises potassium permanganate or a salt of permanganate and an acid, and a molar ratio of the potassium permanganate or a salt of permanganate to the acid can be at or between 5:1 to 1:5.

In some embodiments, the SS-HiVAB can comprise one or more additives comprising ammonium ions in the catholyte. When the catholyte is gelled, the ionic conductivity of the catholyte can be reduced. To increase the ionic conductivity of the system in the gelled state, ammonium salts like ammonium chloride, ammonium acetate, ammonium hydroxide, etc. can be added to the catholyte. In some embodiments, ammonium chloride can be used as an additive as it can reduce the over potential of MnO$_2$ during discharge and charge and can help to facilitate faster reaction kinetics especially in the solid state gel. In some embodiments, the SS-HiVAB catholyte can comprise a permanganate as described with respect to the catholyte herein.

The SS-HiVAB catholyte can have a pH greater than or equal to 0 and less than or equal to 7. The catholyte can be stable at temperatures ranging from 0 to 200° C.

The anode of the SS-HiVAB can be the same or similar to the anodes described with respect to FIGS. 1-5. The anode of the SS-HiVAB can comprise an electroactive material comprising zinc (Zn), aluminum (Al), magnesium (Mg), and/or iron (Fe). The anode can also comprise any of the additives and components as described with regard to the batteries described with respect to FIGS. 1-5. The anode can comprise an anode current collector and be formed using any of the materials, forms, and techniques as described with respect to FIGS. 1-5 herein The anolyte can be a gelled alkaline electrolyte, including any of the polymerized or gelled anolytes described with respect to FIGS. 1-5. Usually a higher concentration of alkaline electrolyte is used to increase the solubility of the metals in the gelled state. For example, the higher concentration can be between 25-70 wt. % of the anolyte. The alkaline electrolyte can comprise any of those described herein, including potassium hydroxide, sodium hydroxide, lithium hydroxide, barium hydroxide, calcium hydroxide, and the like. Other salts and additives can be added to this alkaline electrolyte including any of those described with respect to FIGS. 1-5. For example, additional components used in the anolyte can comprise zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, zinc triflate, aluminum sulfate, iron sulfate, aluminum chloride, iron chloride, magnesium chloride, magnesium sulfate, magnesium perchlorate, aluminum perchlorate, aluminum triflate, iron triflate, magnesium triflate, 1-methyl-1-propylpyrrolidinium chloride, 1-ethyl-3-methylimidazolium chloride, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate, acrylic acid, N,N'-Methylenebisacrylamide, potassium persulfate, ammonium persulfate, sodium persulfate, or a combination thereof. The gelled anolyte can have a pH between about 7 and 15.13.

The SS-HiVAB can take any of the forms and configurations as described with respect to FIGS. 1-5. In some embodiments, a separator is not required. The SS-HiVAB can then take the configuration as shown in FIG. 4, with a gelled catholyte 11 and a gelled anolyte 6 without a separator disposed between the catholyte 11 and the anolyte 6. The two gelled electrolytes can withstand cycling for prolonged times without deterioration. If a separator is used, a cheap separator like cellophane, polyvinyl alcohol, cross-linked polyvinyl alcohol, and the like can be used.

Any of the polymerization and/or gelling processes described with respect to the anolyte in the batteries of FIGS. 1-5. Although one process of polymerizing or gelling the catholye and anolyte is described, other processes as are known in this field can be used to make a gelled catholyte and/or anolyte. It is in the spirit of the present disclosure that using two gelled systems regardless of whatever method is used to gel the electrolytes is a feature of the batteries to allow them to work at high voltages and capacity.

The manganese dioxide can be cycled close to its theoretical one electron and two electron capacity in acidic electrolyte as the electrolyte allows for the manganese ions to complete dissolve during discharge and replate back as manganese dioxide on charge. As no expensive membrane ion selective or bipolar membranes are used the cost of this system is extremely cheap, which makes it marketable for a wide range of applications where cost has been the main inhibiting factor for the use of rechargeable energy storage systems.

The resulting battery can have an open circuit potential between 2 and 3.6V. The battery can be used as a primary battery or as a secondary battery such that the battery is cycled (e.g., discharged and charged) a plurality of times.

The cost of this system can also be relatively inexpensive as compared to more expensive systems such as lithium ion systems and can reach cost targets of a primary system where the range is usually <$15/kWh, but with the added benefit of being rechargeable to allows the lifetime cost of the battery to be the lowest of all the available chemistries in the market. The energy efficiency of this system is also >80-90% depending on the cycling rate used, so the cost to the consumer is also very feasible over the lifetime of the battery use.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

A cathode solution was prepared by mixing 1M manganese sulfate monohydrate with 0.5M sulfuric acid. Generally the ratio between the two solutions is kept at 2, but can be varied depending on the conditions of the cell operation. The anode solution was prepared by mixing potassium pellets with deionized water to create a 45 wt. % potassium hydroxide solution. The polymerization of the anode solution was performed by first dissolving 100 mg of N,N'-methylenebisacrylamide (MBA) in 20 ml of acrylic acid (AA). In the meantime, the 45 wt. % solution of potassium hydroxide (KOH) was cooled to less than 0° C. The mixture of MBA and AA was then slowly added to the cold 45 wt. % KOH solution until it formed a homogenous solution. The solution was slowly added because of the heat generated when AA mixes with KOH. To polymerize the mixed solution, an initiator was added. The initiator used in this example was potassium persulfate (4 wt. % solution). After adding the initiator to the mixed solution the electrolyte will polymerize/gel within few seconds. To slow the polymerization the mixed solution can be kept cold. This polymerized electrolyte can be cut into sheets in any size or shape. In this example, the solution with the initiator was added to the battery compartment containing the zinc (Zn) anode to polymerize within the battery itself.

The anode used in this battery was a zinc anode. The Zn anode can be a powdered electrode, foil or mesh and can be doped or coated with bismuth, bismuth oxide, indium and indium hydroxide if useful. The cathode used in this battery was electrolytic manganese dioxide ($MnO_2$) mixed with carbon nanotubes (CNTs). The electrode mixture comprised of 85 wt. % $MnO_2$ and 15 wt. % CNTs. This mixture was coated on a carbon felt and dried at 60° C.

Figure 6:
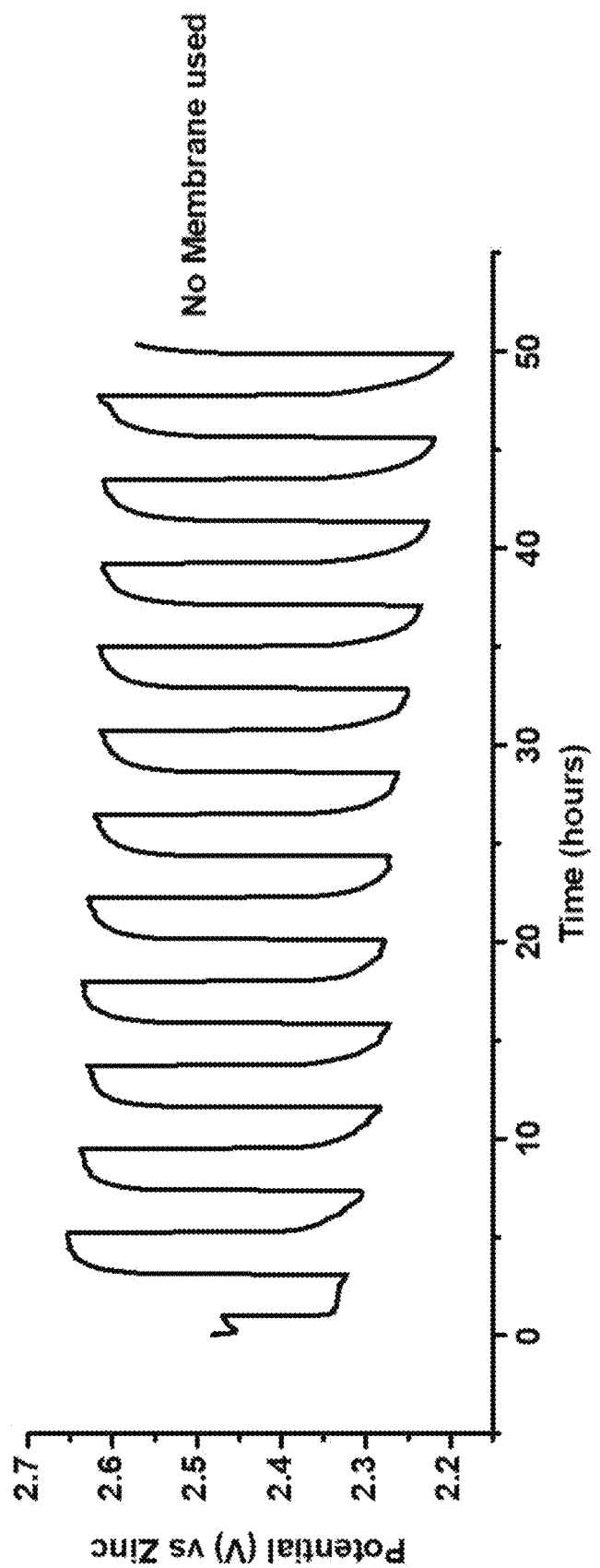
FIG. 6 illustrates a potential vs time plot for a test battery in which zinc is used as the anode as described in Example 1.
Figure 7:
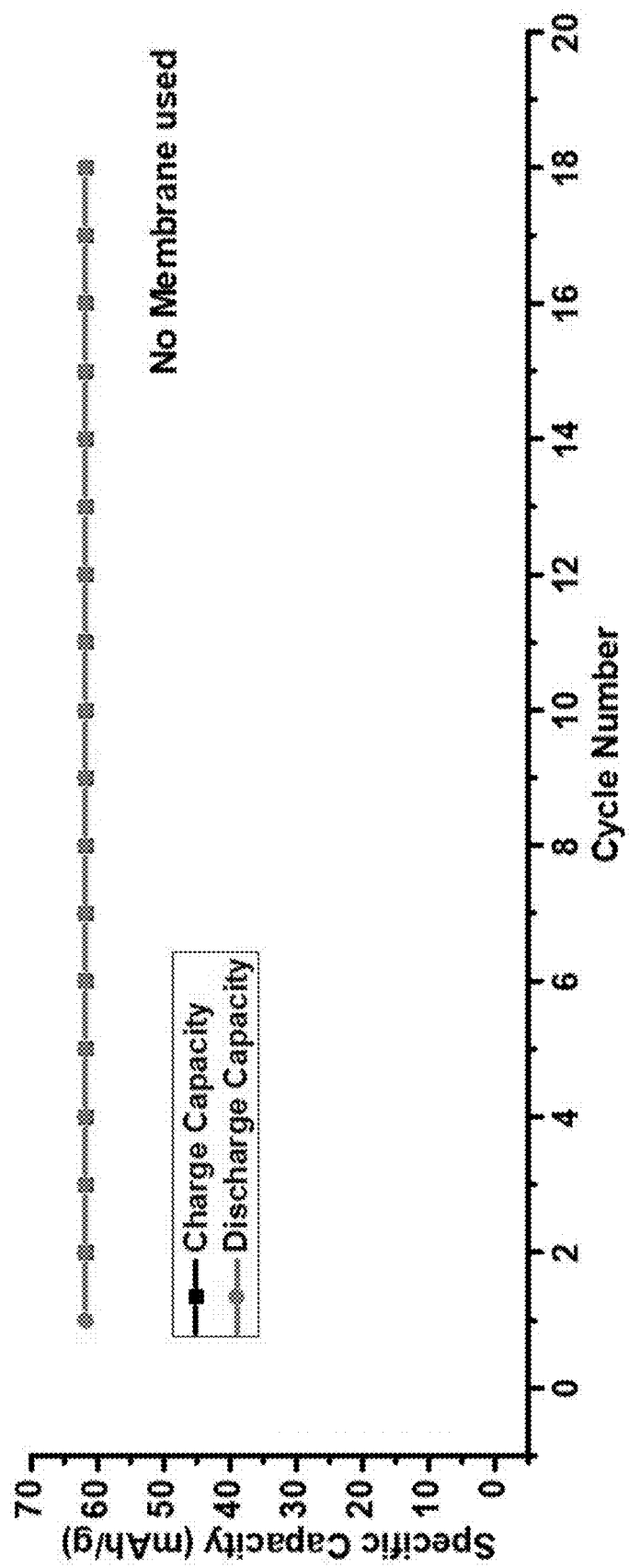
FIG. 7 illustrates a capacity vs cycle number plot for the test battery as described in Example 1.
Figure 8:
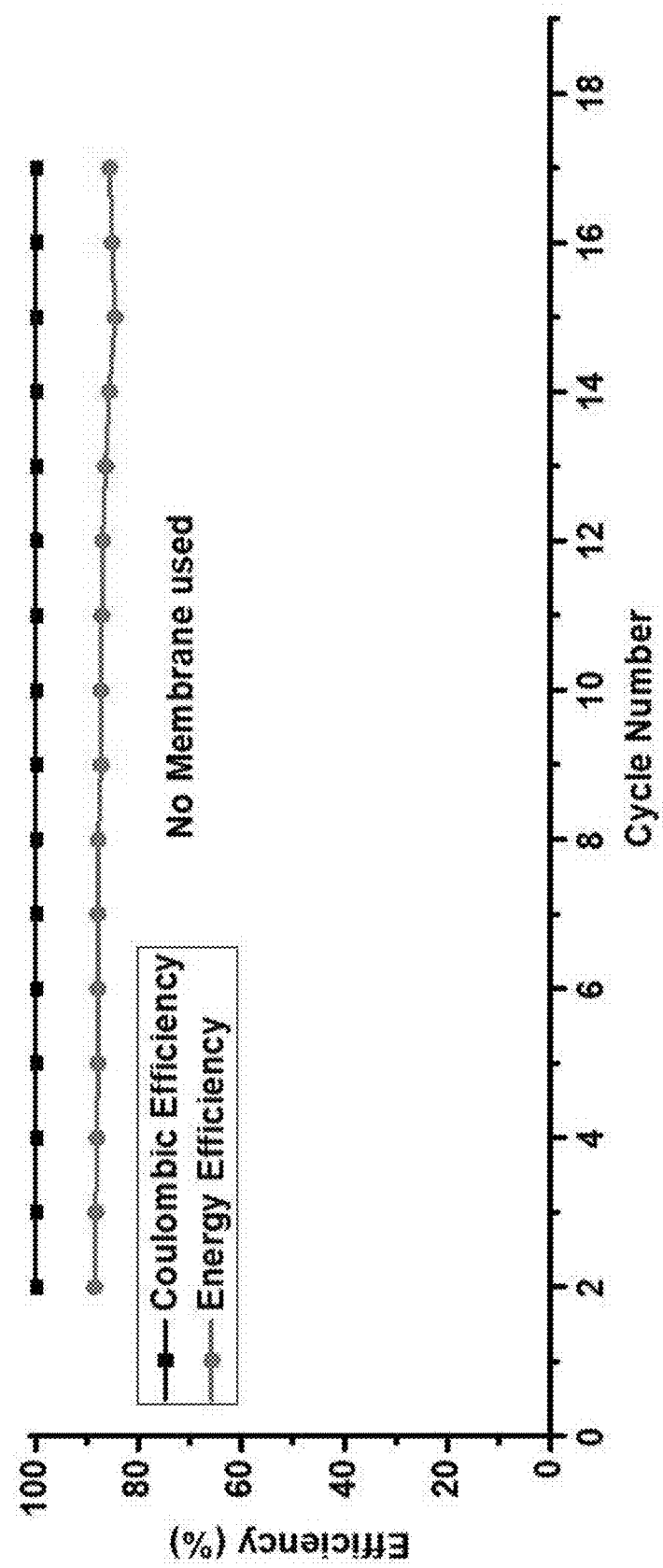
FIG. 8 illustrates the Coulombic and energy efficiencies for the test battery as described in Example 1.

The battery assembly used the above described cathode and anode, and soaked them in their respective cathode and anode electrolytes. CELLOPHANE® was used as a separator. The battery was designed to be cycled at 20% of 1e capacity (308 mAh/g) at C/2 (where the C-rate is a measure of the rate at which a battery is charged or discharged relative to its capacity). The cycling results of this battery are shown in FIG. 6, where it can be seen that the open circuit potential was 2.47V. In FIG. 6, the battery is shown to cycle very stably between 2.67 and 2.2V. This is the first time that an aqueous $MnO_2$-Zn battery cycling over 2V is shown in literature. The capacity delivered over cycle life is shown in FIG. 7, where it is successful in delivering 60 mAh/g and chagrining it back to its designed capacity. The cycling is also very stable in this new system. The energy efficiency of the battery is high at ~85-87% (FIG. 8), which is important for any energy storage system. This is the first such demonstration of a $MnO_2$-Zn battery over 2V.

Example 2

Figure 9:
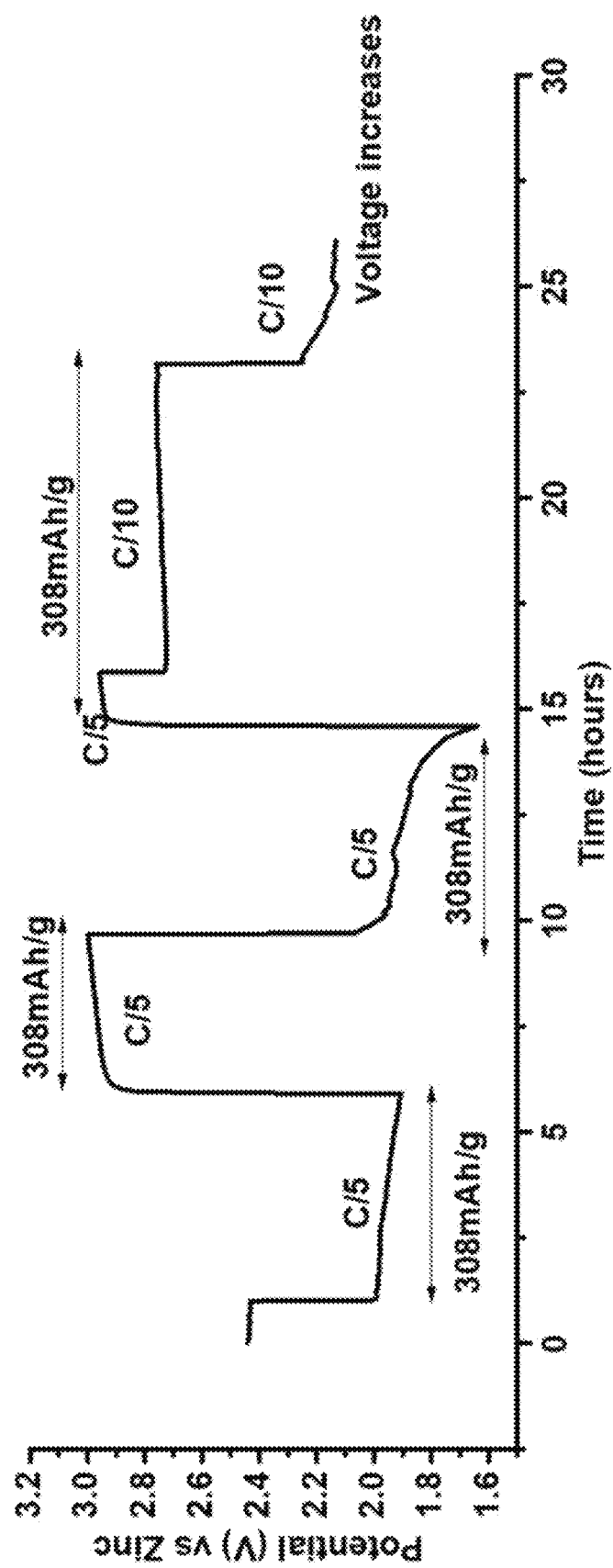
FIG. 9 illustrates a potential vs time curve for a test battery as described in Example 2.

The design of the battery in this example is the same as described in Example 1. The difference in this example is the cycling of the battery at 100% of one electron (308 mAh/g) at C/5 and C/10. The cycling results are shown in FIG. 9. The battery is able to cycle very stable at high C-rates accessing the theoretical one electron capacity. When the C-rate is changed to C/10 the cycling and energy efficiency of the battery becomes considerably better.

Example 3

Figure 10:
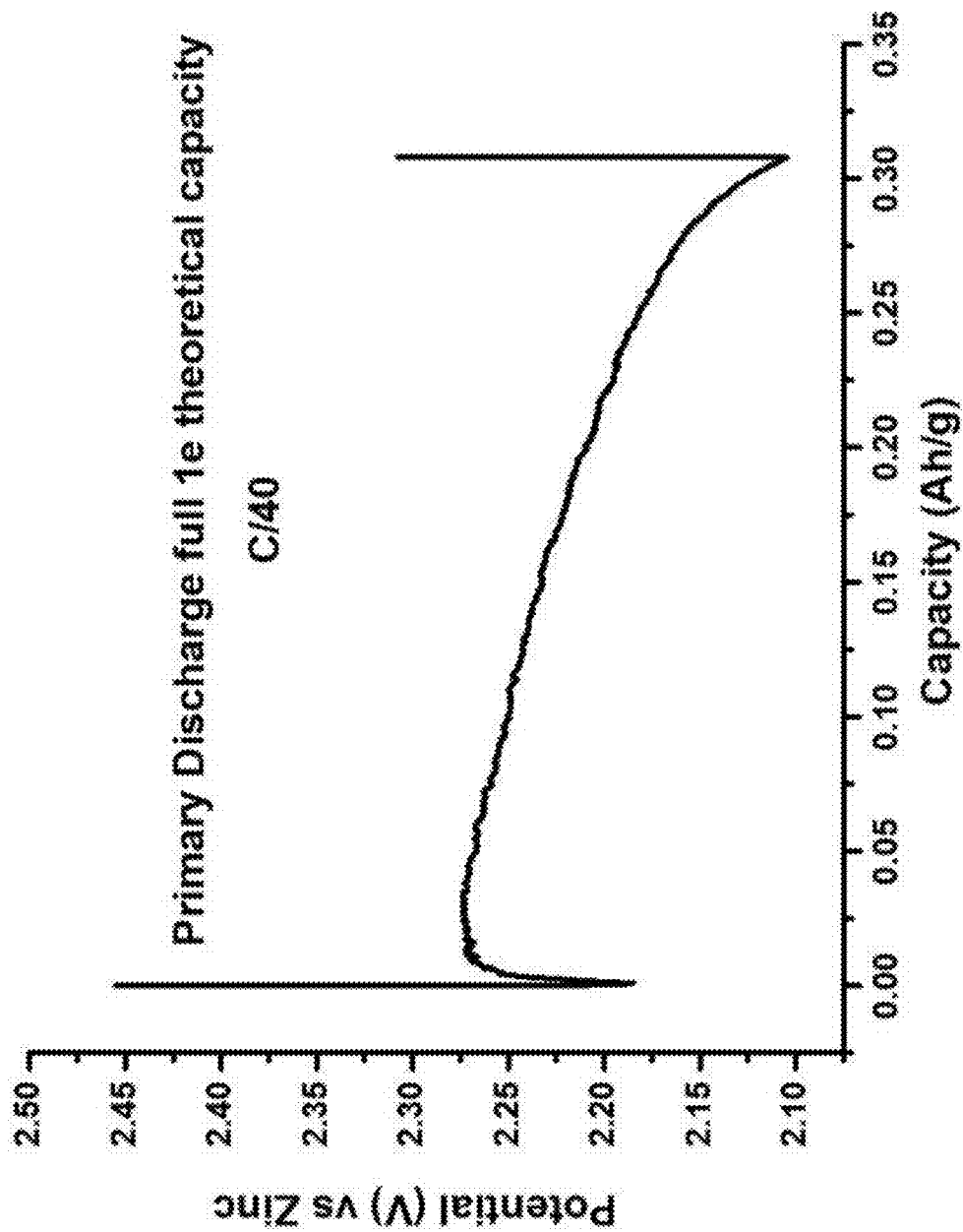
FIG. 10 illustrates a primary discharge potential chart of a test battery as described in Example 3.

The design of the battery in this example is exactly the same as described in Example 1. The difference in this example is the cycling of the battery at high capacity (Ah) at 100% of one electron (308 mAh/g) at C/40. This was done to show the application of this new battery for primary applications as well. The primary battery industry is looking for cheap high voltage battery chemistries. The alkaline and Leclanche chemistry unfortunately have a low voltage of around 1.1-1.2V and fail to compete with lithium-ion in terms of voltage. The primary discharge of this new battery is shown in FIG. 10, where it can be seen that the complete one electron capacity is delivered between 2.1 and 2.3V. This is a breakthrough for aqueous battery systems.

Example 4

A cathode solution was prepared by mixing 0.5M potassium permanganate with 0.5M sulfuric acid. Generally the ratio between the two solutions is kept at 1:3, but can be varied depending on the conditions of the cell operation. The anode solution was prepared by mixing potassium pellets with deionized water to create a 45 wt. % solution. The polymerization of the anode solution was done by first dissolving 100 mg of N,N'-methylenebisacrylamide (MBA) in 20 ml of acrylic acid (AA). In the meantime, the 45 wt. % solution of potassium hydroxide (KOH) was cooled to less than 0° C. The mixture of MBA and AA was then slowly added to the cold 45 wt. % KOH solution until it formed a homogenous solution. The solution was added slowly because of the heat generated with AA mixes with KOH. To polymerize the mixed solution, an initiator was used. The initiator used in this example was potassium persulfate (4 wt. % solution). After adding the initiator to the mixed solution the electrolyte can polymerize/gel within few seconds. To slow the polymerization the mixed solution can be kept cold. This polymerized electrolyte can be cut into sheets in any size or shape. In this example, the solution with the initiator was added to the battery compartment containing the zinc (Zn) anode to polymerize within the battery itself.

The anode used in this battery was a zinc anode. The Zn anode can be a powdered electrode, foil or mesh and can be doped or coated with bismuth, bismuth oxide, indium and indium hydroxide if useful. The cathode used in this battery was electrolytic manganese dioxide ($MnO_2$) mixed with carbon nanotubes (CNTs). The electrode mixture comprised of 85 wt. % $MnO_2$ and 15 wt. % CNTs. This mixture was coated on a carbon felt and dried at 60° C.

Figure 11:
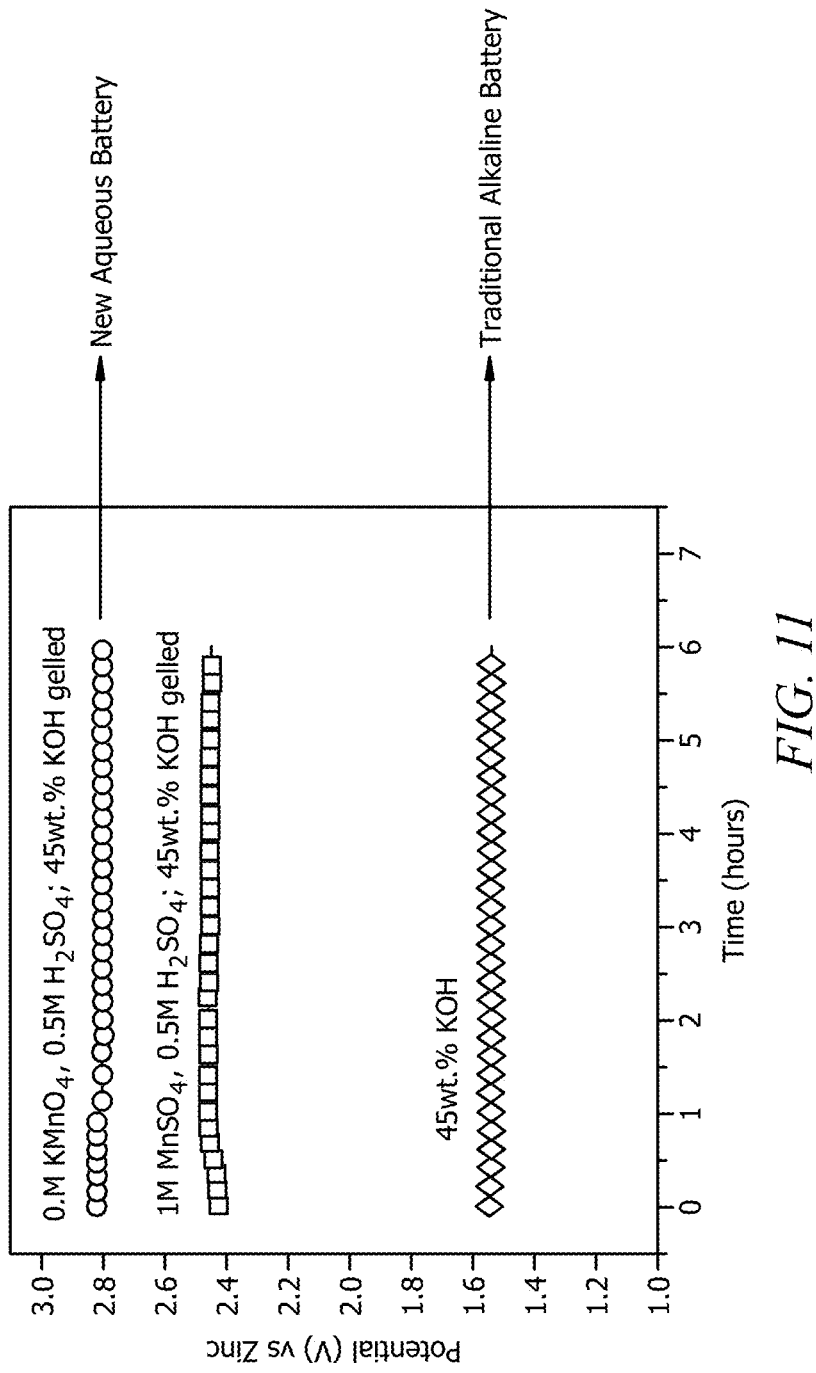
FIG. 11 illustrates a chart of the open circuit potential of three batteries with different electrolytes as described in Example 4.
Figure 12:
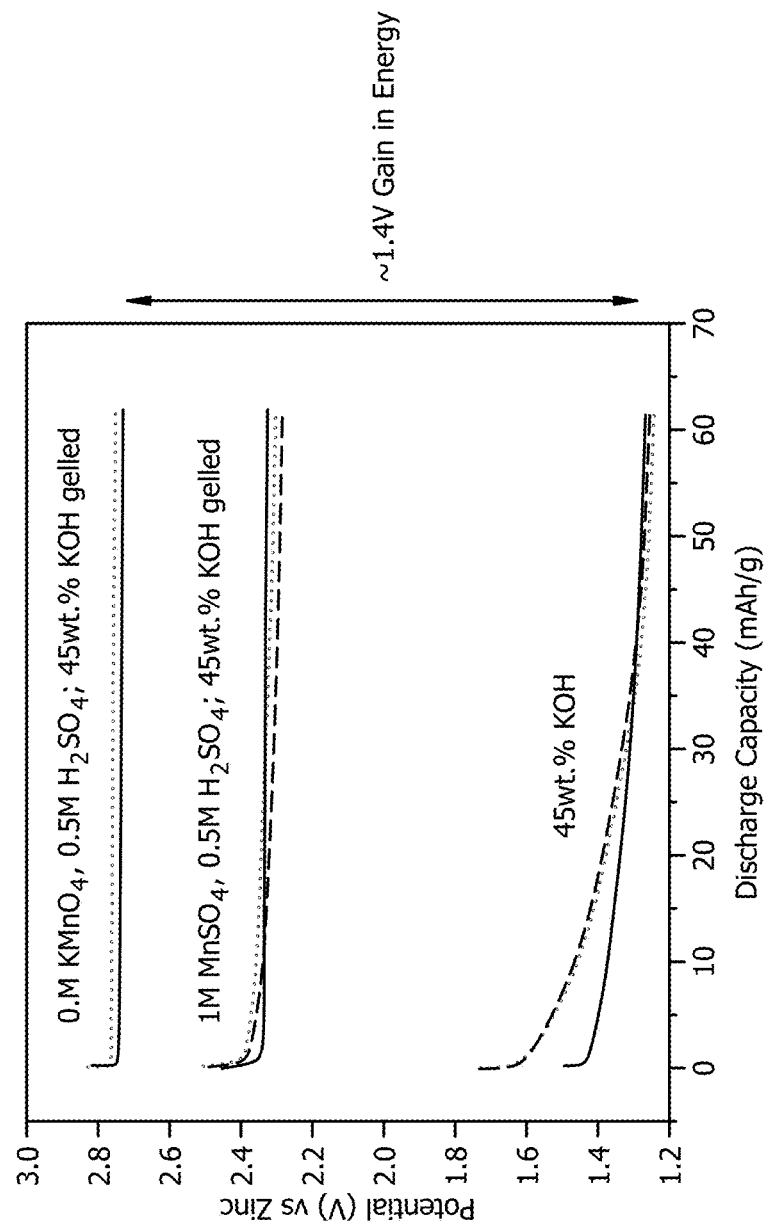
FIG. 12 illustrates the first three discharge cycles for three batteries with different electrolytes as described in Example 4.
Figure 13:
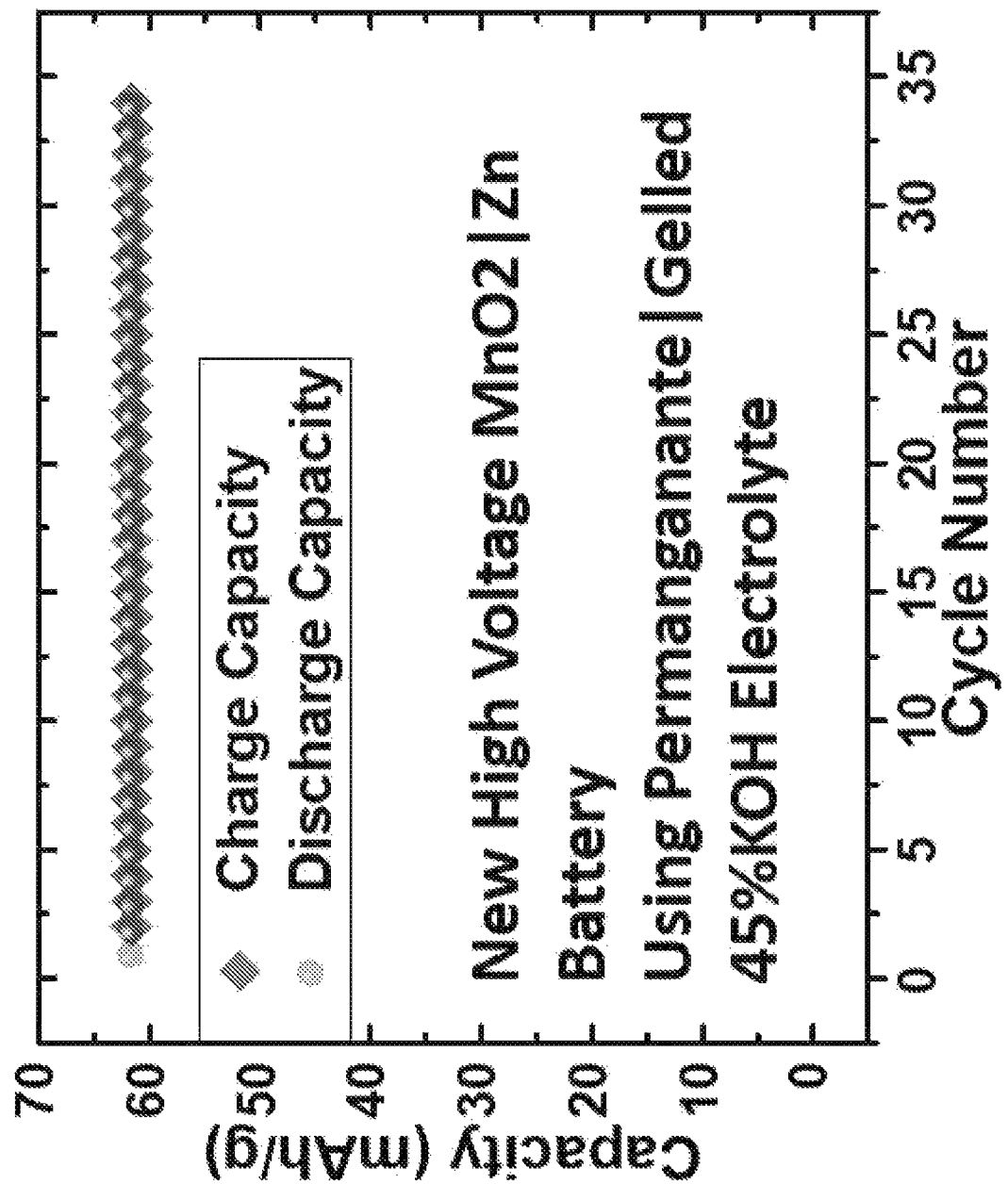
FIG. 13 illustrates the cycle life of a manganese dioxide battery using permanganate as described in Example 4.

The battery assembly used the above described cathode and anode, and they were soaked in their respective cathode and anode electrolytes. CELLOPHANE® was used as a separator. The battery was designed to be cycled at 20% of $1e$ capacity (308 mAh/g) at C/2. The cycling results of this battery are shown in FIG. 11, where it can be seen that the open circuit potential was 2.8V. In FIG. 11, the open circuit potential of a $MnO_2$|Zn battery is shown with different electrolytes. If manganese sulfate is used as the cathode electrolyte the open circuit potential is usually between 2.4-2.5V, however, the permanganate allow the potential to be increased to 2.8V. The traditional alkaline battery using 45 wt. % KOH showed an open circuit potential of ~1.55V, which is much lower compared the newly designed battery. In FIG. 12, the first three discharge curves are shown for the three batteries containing different electrolytes. It can be seen that using permanganates as the electrolyte on the cathode results in a gain of ~1.4V in energy compared to the traditional alkaline battery. FIG. 13 shows the cycle life of the new battery, where it can be seen that it is rechargeable. This is the first time that an aqueous $MnO_2$-Zn battery cycling ~2.8V is shown in literature.

Example 5

Figure 14:
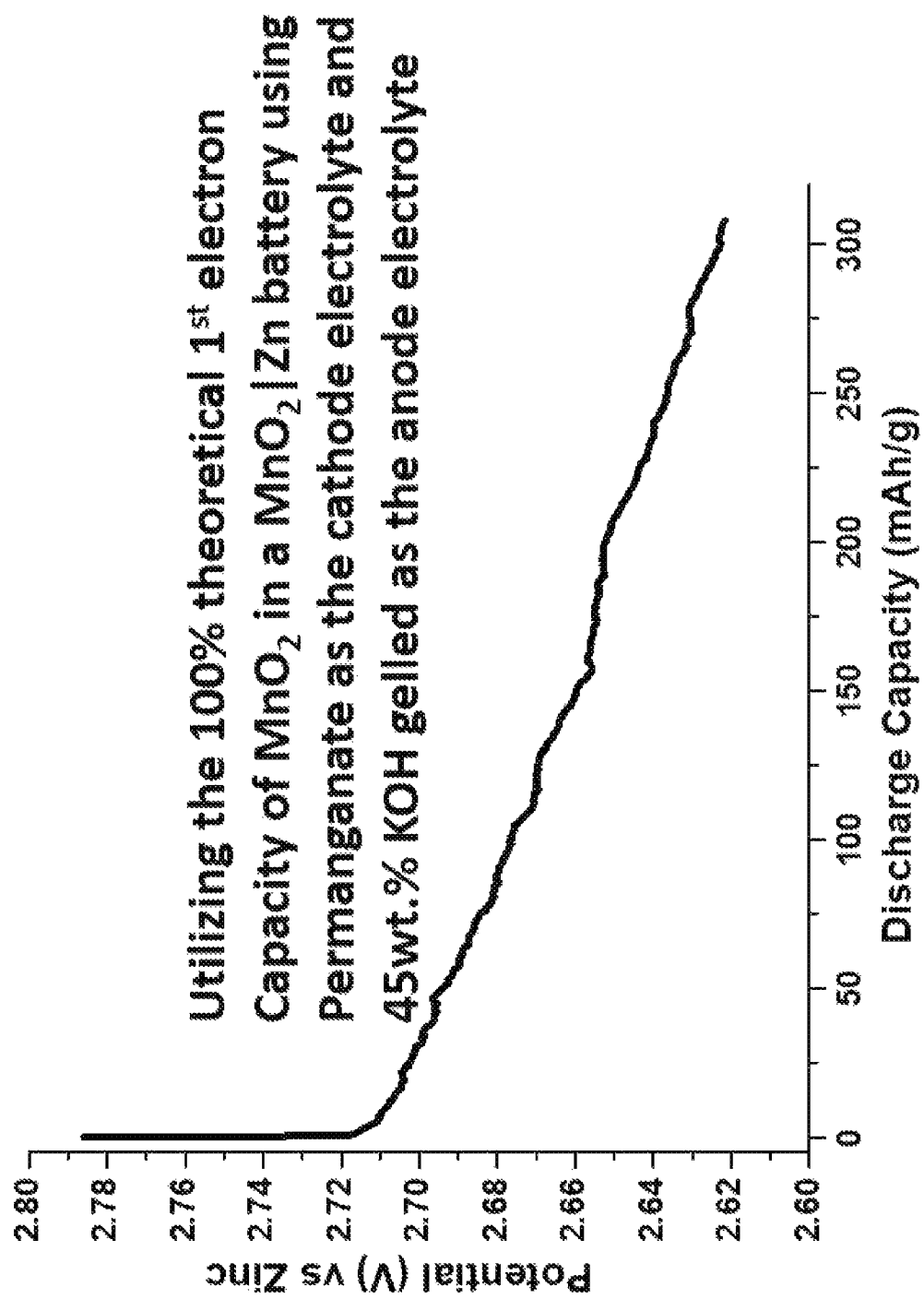
FIG. 14 illustrates a potential vs discharge capacity chart for a test battery as described in Example 5.

The design of the battery in this example is exactly the same as described in Example 4. The difference in this example is the cycling of the battery at 100% of one electron (308 mAh/g) at C/10. The cycling results are shown in FIG. 14. The battery is able to deliver the complete theoretical $1^{st}$ electron capacity before 2.62V, which is a breakthrough in battery systems. This is the first time that a high voltage $MnO_2$|Zn battery over 2.6V delivering 308 mAh/g capacity has been reported. This opens up the usage of aqueous batteries for applications where expensive and dangerous Li-ion batteries currently dominate.

Example 6

Figure 16:
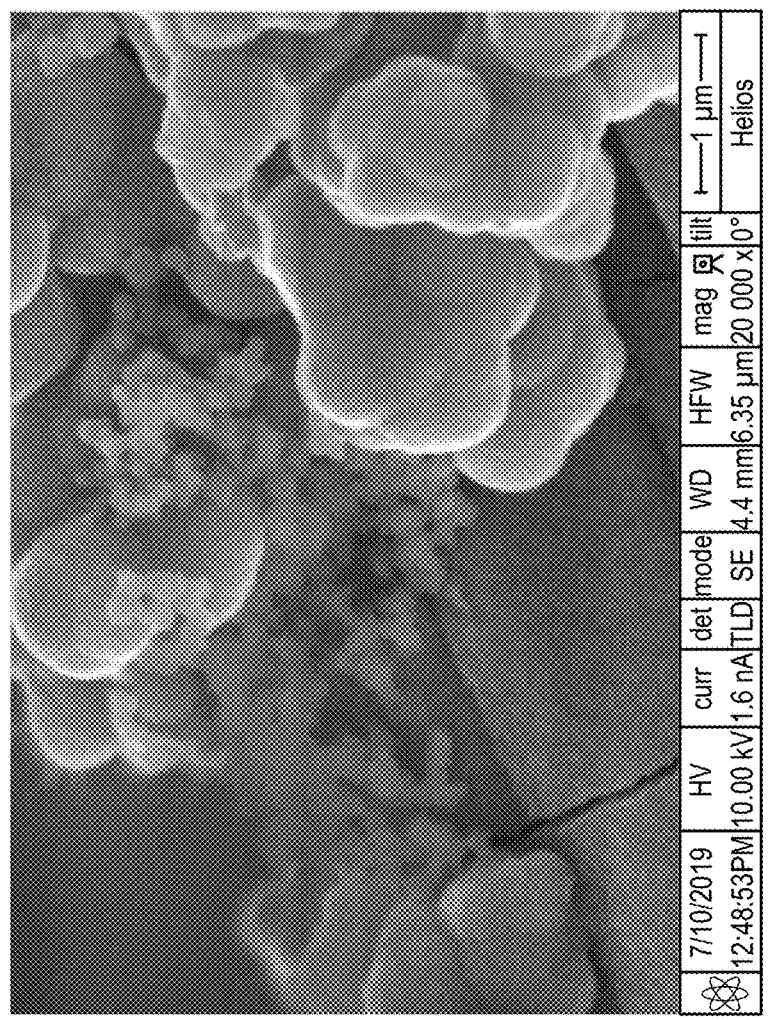
FIG. 16 illustrates an SEM image of a charged electrode showing the manganese dioxide deposition as described in Example 6.
Figure 15:
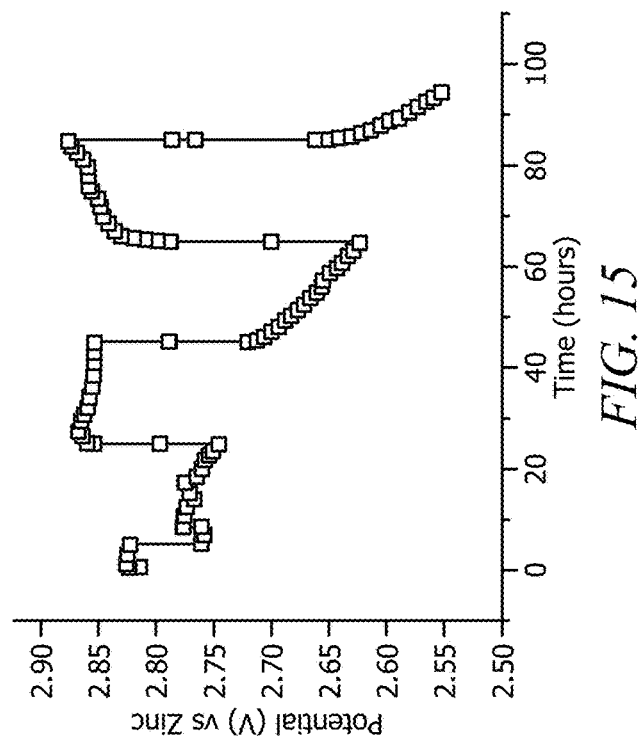
FIG. 15 illustrates cycling curves for a manganese dioxide battery as described in Example 6.
Figure 18:
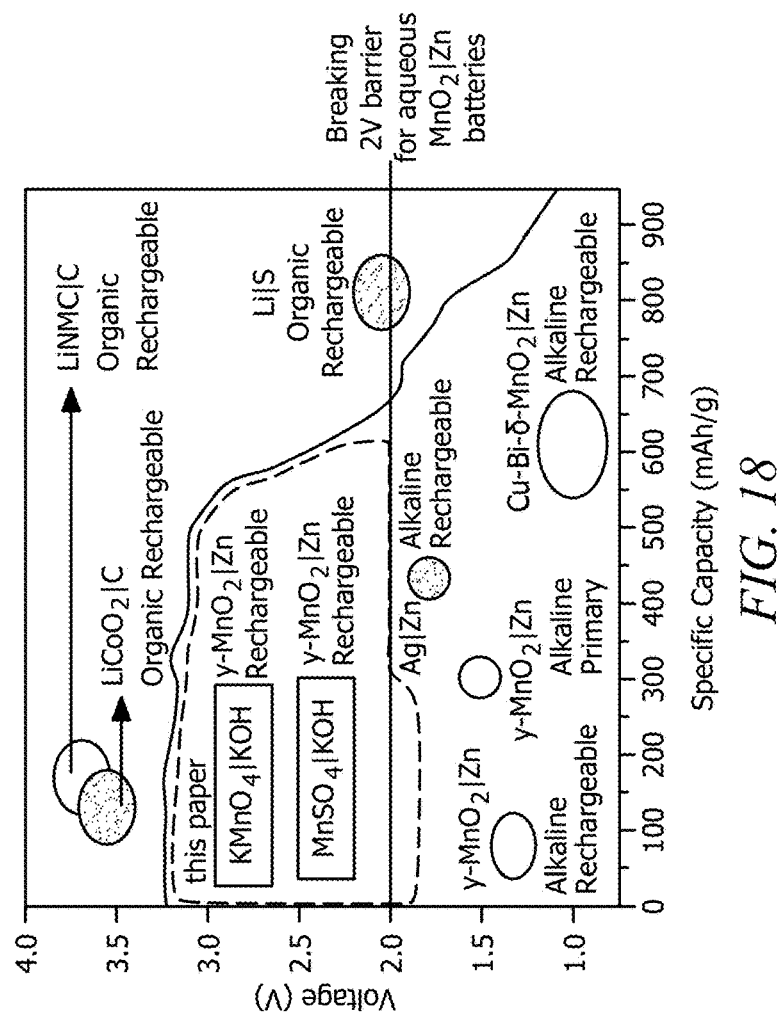
FIG. 18 schematically illustrates a voltage vs capacity chart showing various technologies.
Figure 17:
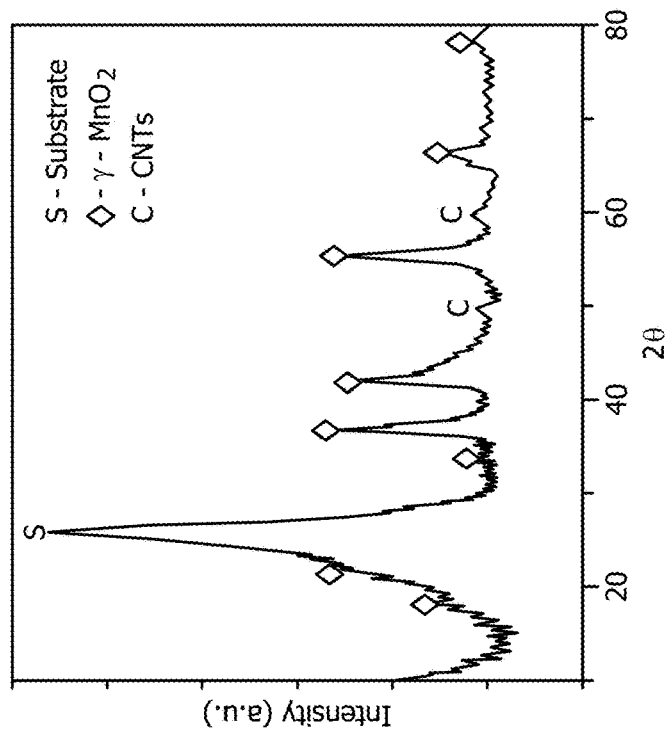
FIG. 17 illustrates an X-ray diffraction pattern of the cathode containing manganese dioxide at the end of the charge cycle as described in Example 6.

The design of the battery in this example is exactly the same as described in Example 4. The difference in this example is the continuous cycling of the battery at 100% of one electron (308 mAh/g) at C/20. The cycling results are shown in FIG. 15. The battery is able to access the complete 1e (308 mAh/g). Another battery with the same conditions was cycled many times and stopped on charge. SEM image of this charged cathode is shown in FIG. 16, where the birnessite structure can be seen. XRD at the end of charge also shows γ-$MnO_2$ which signifies manganese dioxide forming as shown in FIG. 17. In FIG. 18, a figure is shown which places the battery deisgn of this patent with respect to the battery literature. For the very first time, a breakthrough of the 2V barrier for aqueous $MnO_2$|Zn batteries is shown, which make it highly competitive in terms of energy density and cost compared to lithium-ion batteries. This is a significant advancement in aqueous battery chemistry.

Example 7

Figure 19:
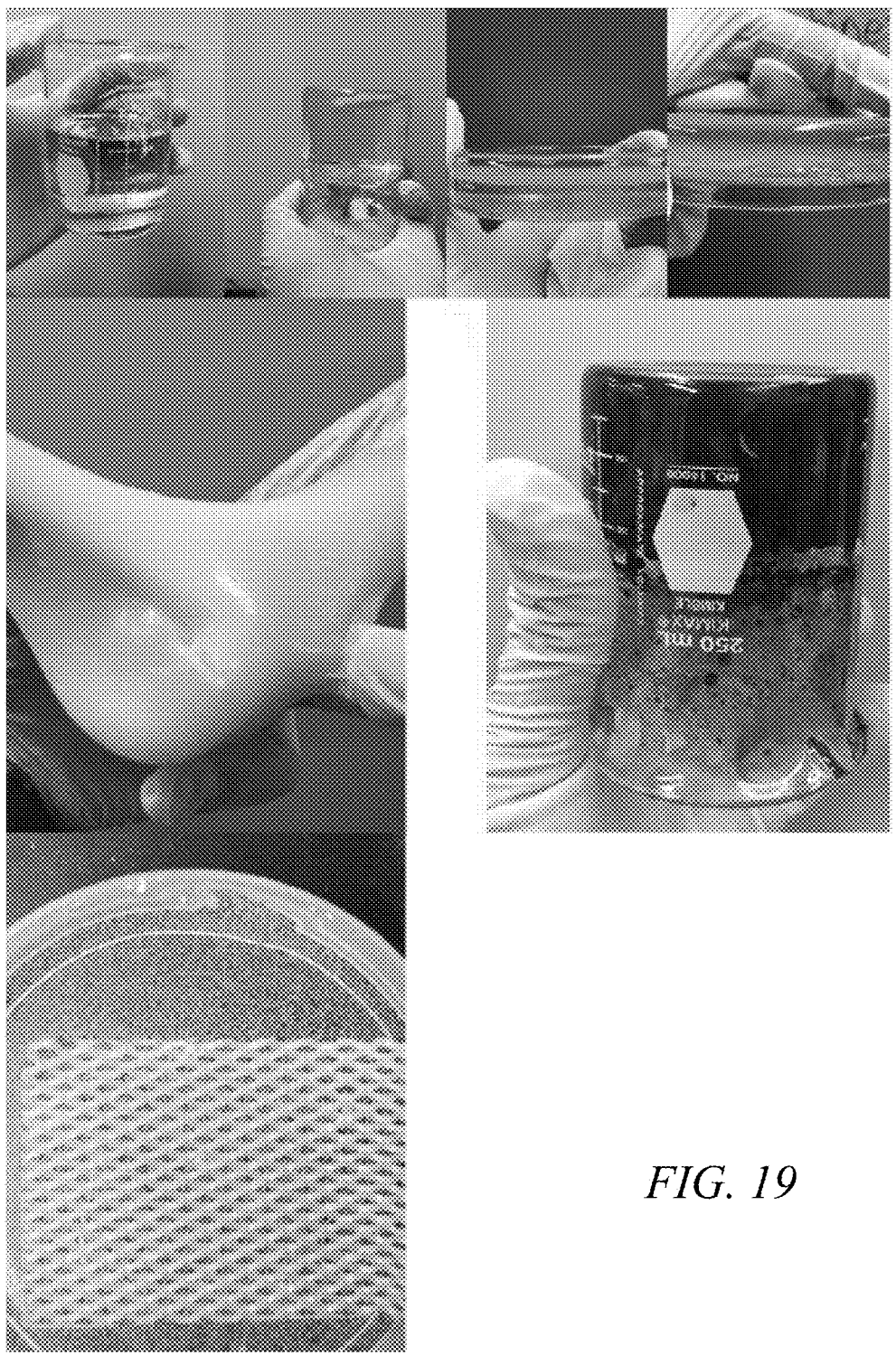
FIG. 19 illustrates images of gelled manganese sulfate with sulfuric acid with various additives and pictures of gelled potassium hydroxide with a zinc mesh (lower left image) as described in Example 7.

The method for making a solid state gelled catholyte involves the addition of acrylamide to a mixture of 1M manganese sulfate and 0.5$H_2SO_4$ solution or 1M manganese sulfate, 3M ammonium sulfate and 0.5M$H_2SO_4$ solution or 0.5M potassium permanganate and 0.5M sulfuric acid solution. If 200 ml of total solution is made then around 50 g of acrylamide is added to the solution and mixed vigorously between 70-90° C. for at least an hour till the solution is homogenous. After the solution is mixed well then between 100-700 mg of N,N'-methylenebisacrylamide and 100 mg-1500 mg of potassium persulfate is added to the solution and mixed between 2-48 hrs till the solution completely gels. The picture of the gelled solutions are shown in FIG. 19.

Similarly, the solid state gelled anolyte was prepared by mixing potassium pellets with deionized water to create a 45 wt. % solution. The polymerization of the anode solution was done by first dissolving 100 mg of N,N'-methylenebisacrylamide (MBA) in 20 ml of acrylic acid (AA). In the meantime the 45 wt. % solution of potassium hydroxide (KOH) was cooled to less than 0° C. The mixture of MBA and AA was then slowly added to the cold 45 wt. % KOH solution till it formed a homogenous solution. The solution was added slowly because of the heat generated with AA mixes with KOH. To polymerize the mixed solution, an initiator was used. The initiator used in this example was potassium persulfate (4 wt. % solution). After adding the initiator to the mixed solution the electrolyte will polymerize/gel within few seconds. To slow the polymerization the mixed solution can be kept cold. This polymerized electrolyte can be cut into sheets in any size or shape as per required. A picture of a Zinc mesh embedded in gelled 45 wt. % KOH solution is shown in the lower left photograph of FIG. 19.

Example 8

Figure 20:
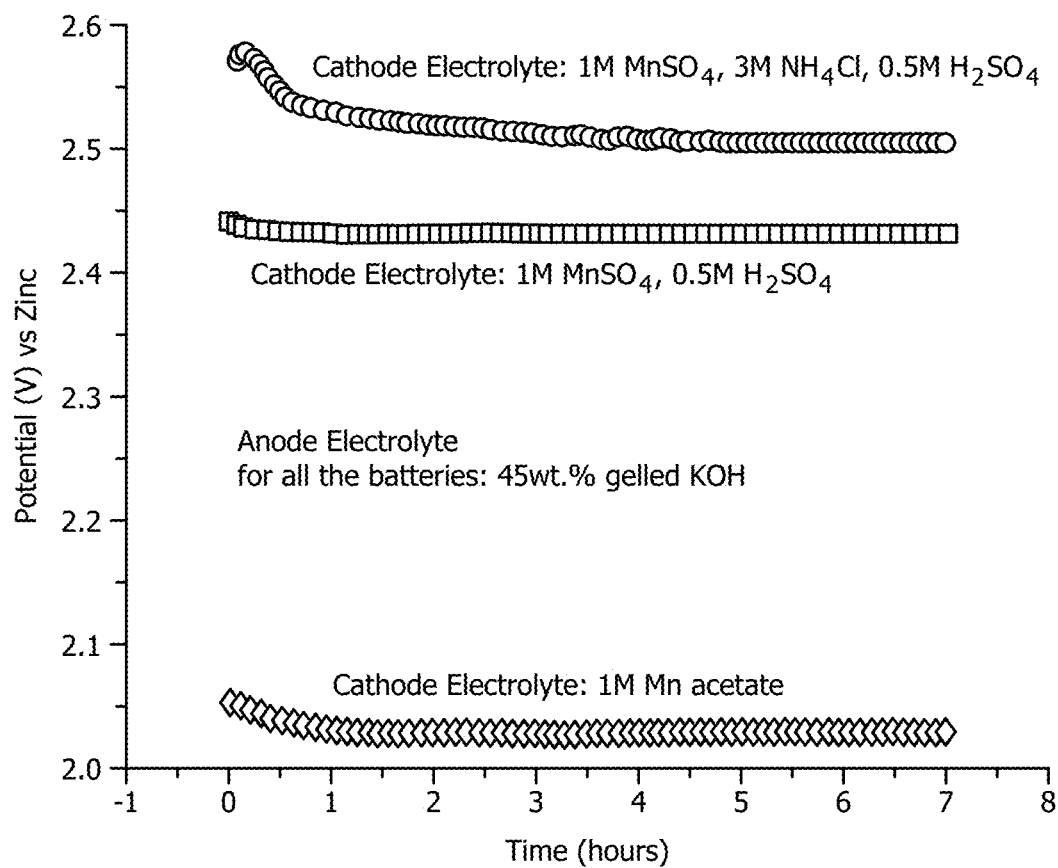
FIG. 20 illustrates the open circuit potential of a test battery as described in Example 8.
Figure 21:
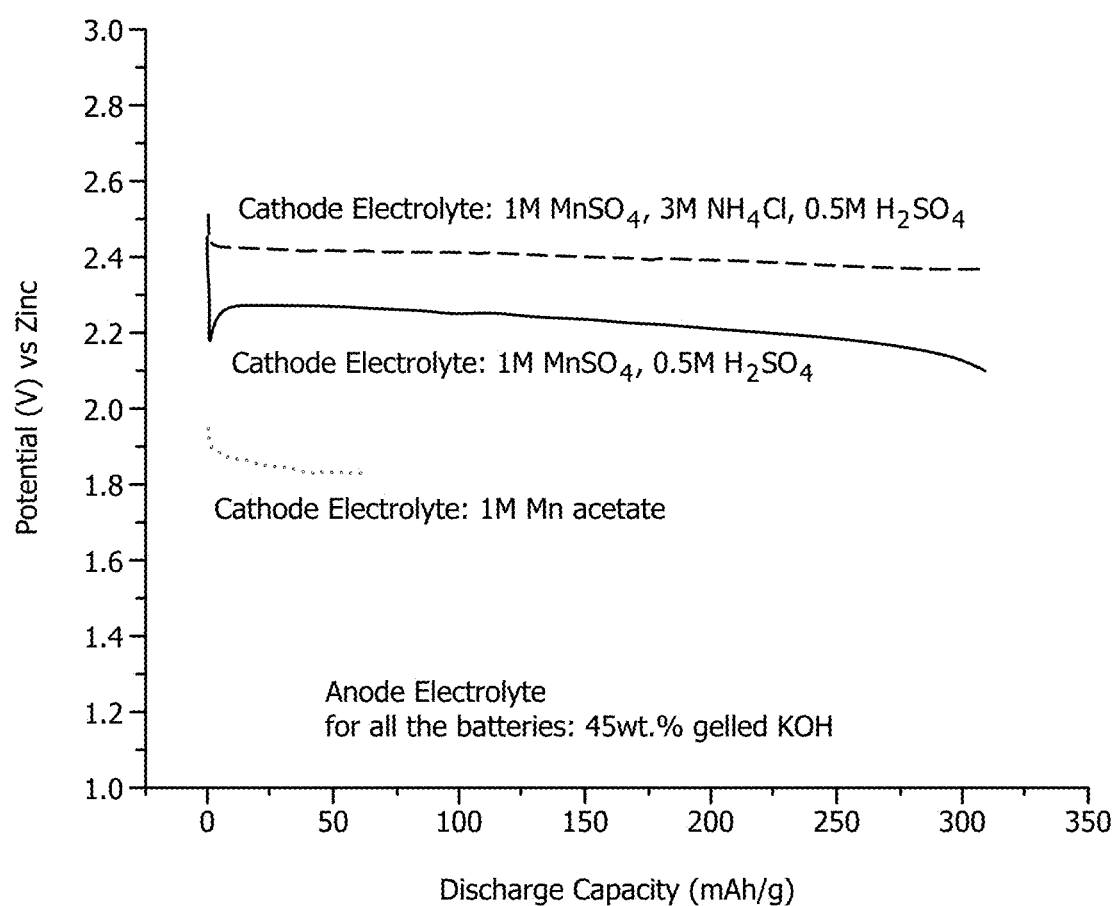
FIG. 21 illustrates discharge curves for three test batteries as described in Example 8.
Figure 22:
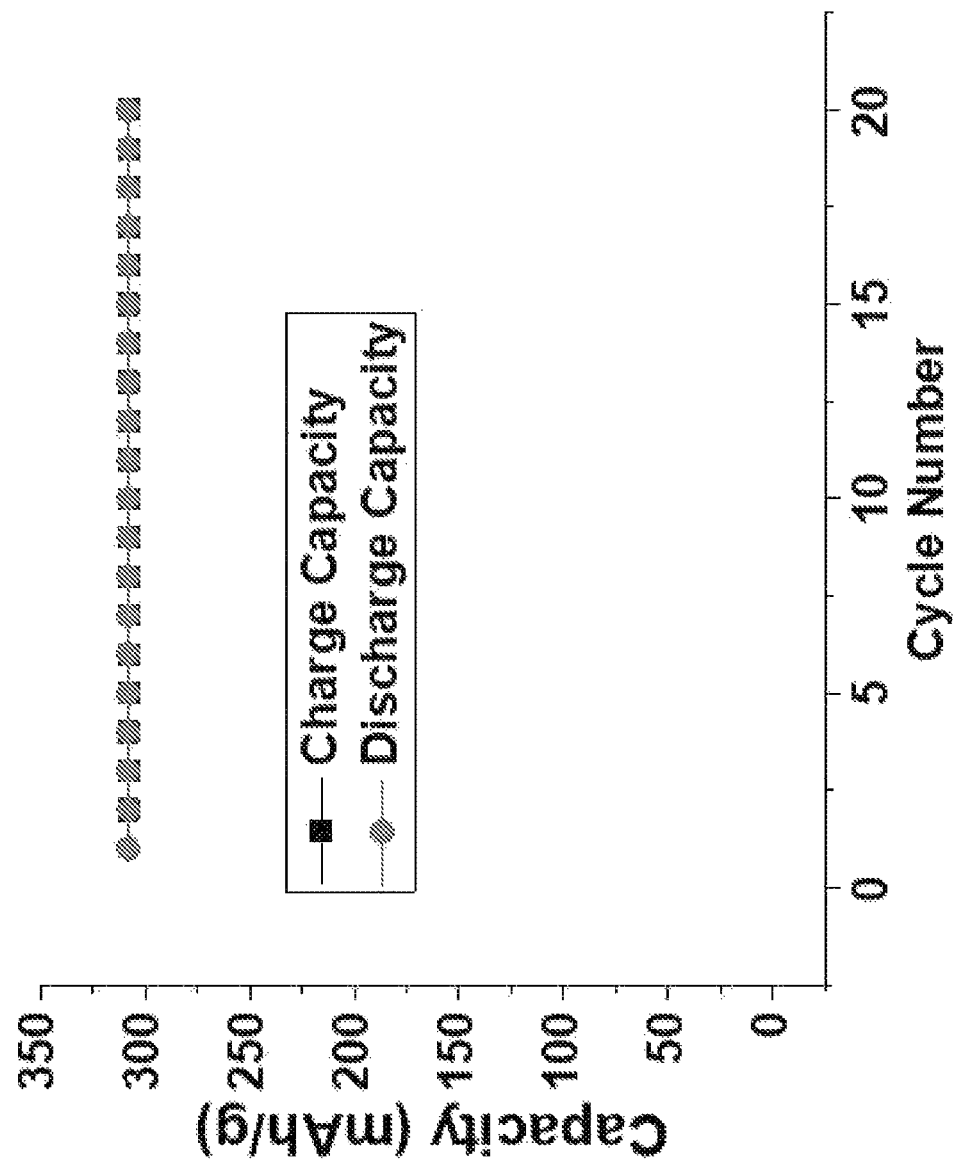
FIG. 22 illustrates the cycling performance of a test battery as described in Example 8.

Ammonium chloride was added to a solution of 1M manganese sulfate and 0.5M sulfuric acid to help in increasing ionic conductivity and result in better overall potential. This was confirmed in cells with liquid cathode electrolyte before polymerizing. Three cells with liquid cathode electrolyte and gelled 45 wt. % KOH anode electrolyte were made. Zn mesh was used as the anode. The cathode was 85 wt. % manganese dioxide and 15 wt. % carbon nanotubes pasted on carbon felt. The mass loading of the cathode was ~10-20 mg/cm$^2$. These cells were made with having a cellophane separator between the liquid cathode electrolyte and the gelled anode electrolyte. A control cell was made with 1M manganese sulfate and 0.5M sulfuric acid as the cathode electrolyte, another cell with 3M ammonium chloride added to 1M manganese sulfate and 0.5M sulfuric acid cathode electrolyte and a 1M manganese acetate electrolyte to test if acetate ions can help in potential and ionic conductivity properties. The open circuit potentials for the three cells are shown in FIG. 20. It is clear that after 7 hours of rest on open circuit the cell with 3M ammonium chloride added to 1M manganese sulfate and 0.5M sulfuric acid cathode electrolyte and 45 wt. % gelled KOH anode electrolyte exhibits the highest potential of ~2.58V. The discharge curves of these cells are also shown in FIG. 21, where the cells with manganese sulfate as the cathode electrolyte were designed to access 308 mAh/g theoretical capacity of $MnO_2$ and the cell with acetate as the cathode electrolyte was designed to access 20% of 308 mAh/g. All the cells discharge to their designed capacity, but the cell with 3M ammonium chloride added to 1M manganese sulfate and 0.5M sulfuric acid cathode electrolyte gives the best potential for the accessed capacity, which translates to the highest energy obtained. Therefore, adding 3M ammonium chloride helps in accessing higher energy because of better potential and capacity accessibility characteristics. The cycling performance of the cell with 3M ammonium chloride added to 1M manganese sulfate and 0.5M sulfuric acid cathode electrolyte shown in FIG. 22 exhibit 100% rechargeability to its theoretical capacity of 308 mAh/g.

Example 9

Figure 23:
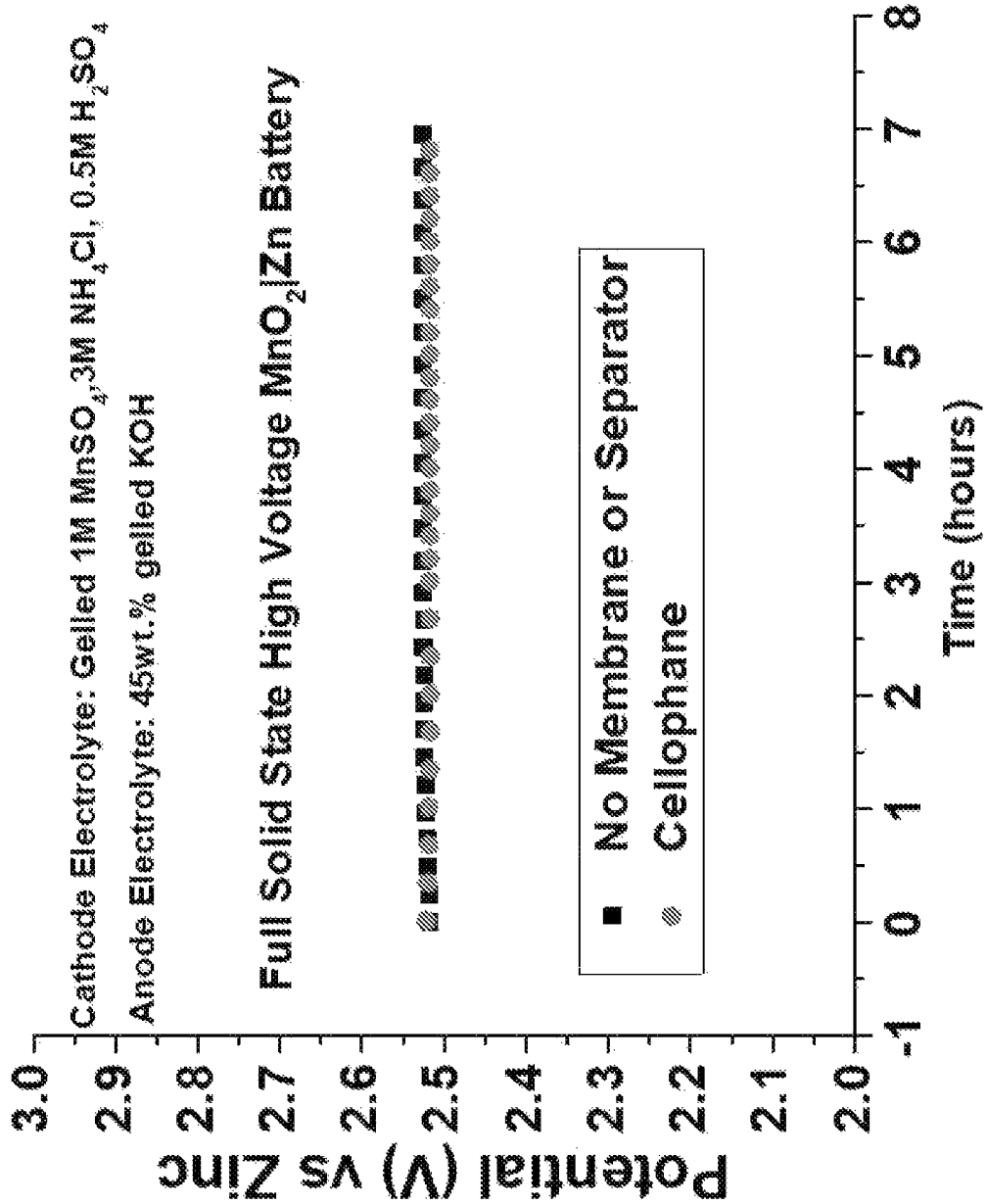
FIG. 23 illustrates the open circuit potential of a test battery as described in Example 9.
Figure 24:
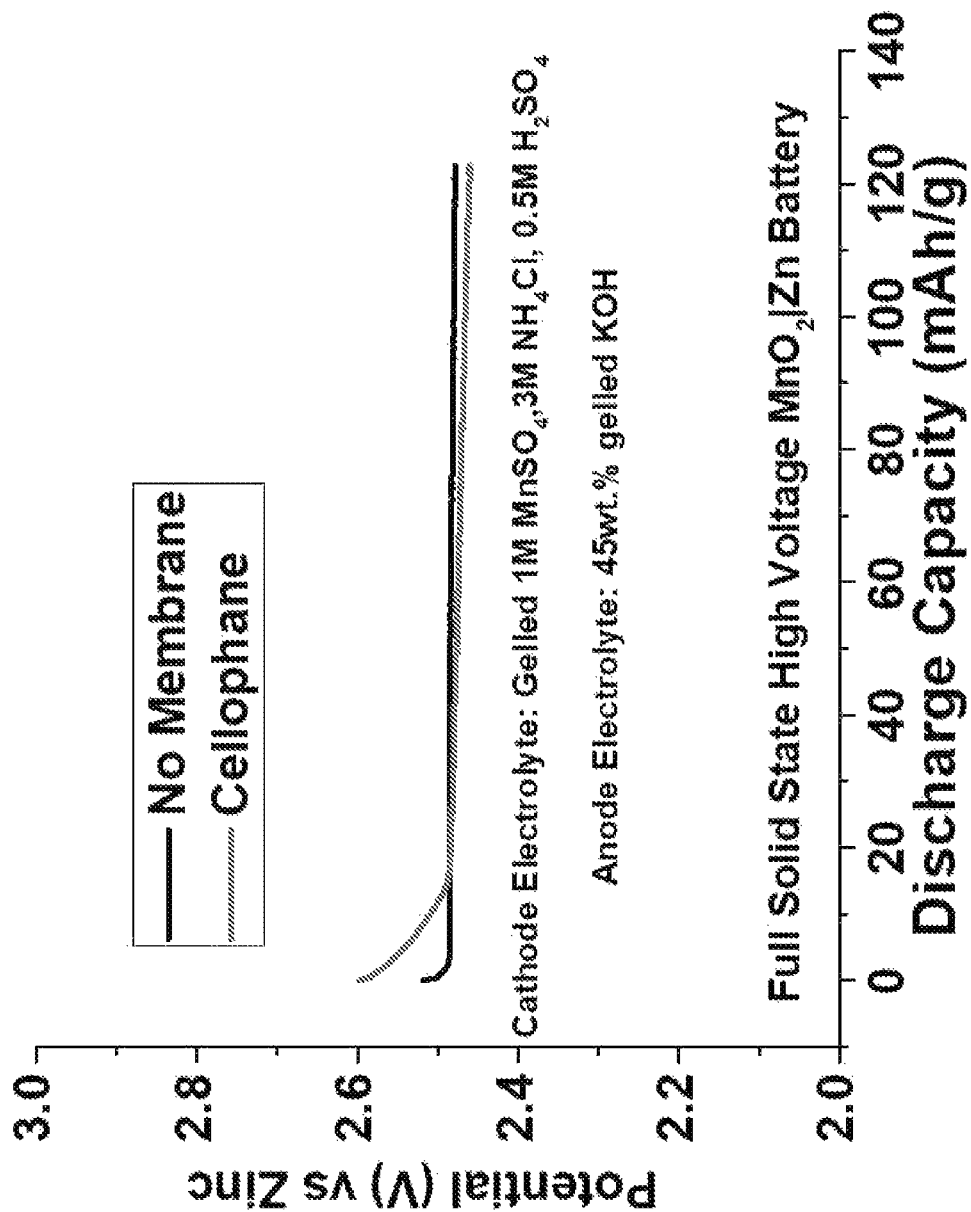
FIG. 24 illustrates the discharge curve of a membrane-less test battery as described in Example 9.
Figure 25:
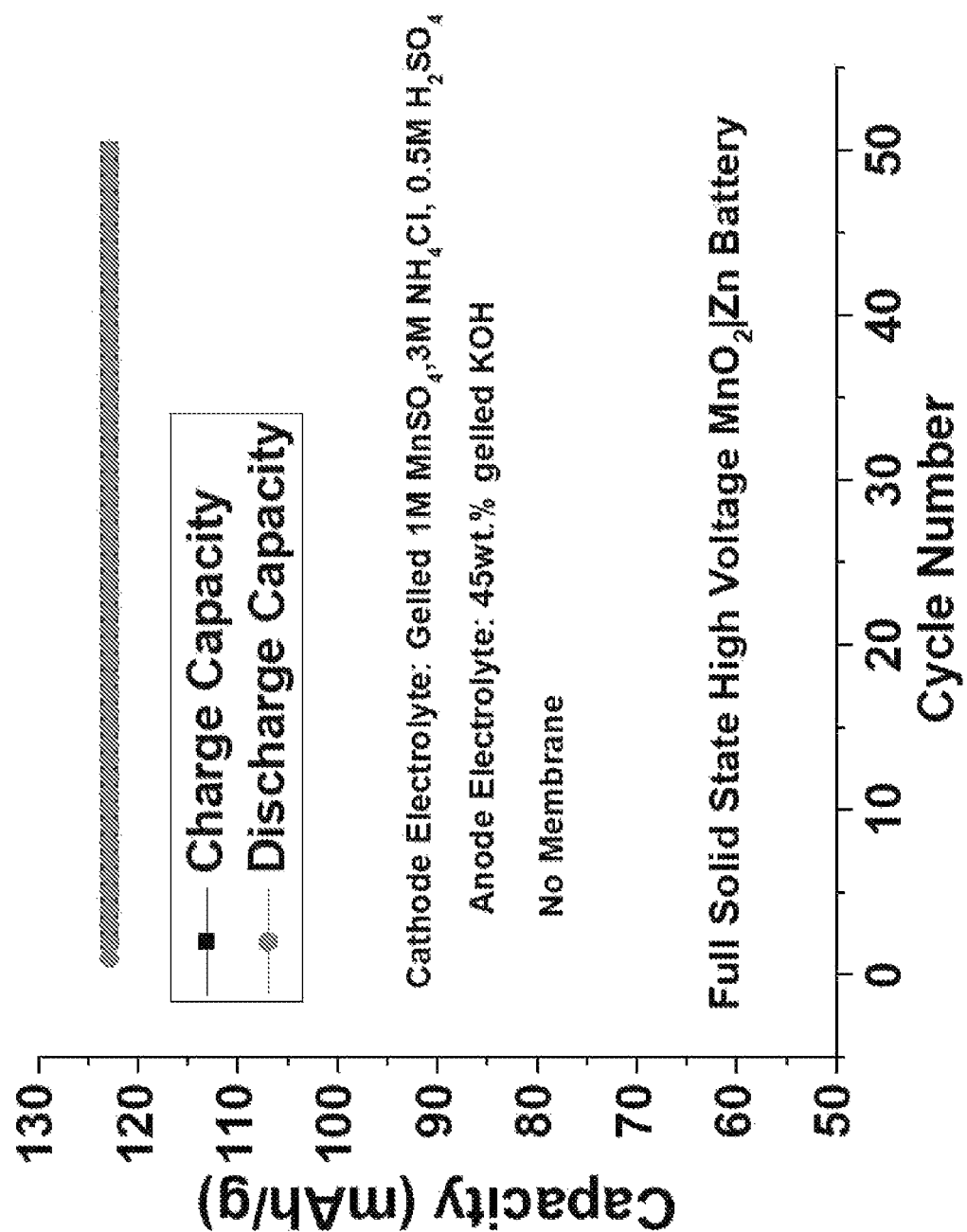
FIG. 25 illustrates the cycling performance of a membrane-less test battery as described in Example 9.

To make a completely solid state battery, the cathode electrolyte with 3M ammonium chloride added to 1M manganese sulfate and 0.5M sulfuric acid was completely gelled according to the procedure mentioned in Example 7. This gelled polymerized cathode electrolyte was placed on top of the cathode, which was a carbon felt with ~10-20 mg/cm$^2$ loading of 85 wt. % manganese dioxide and 15 wt. % carbon nanotubes. The anode was 45 wt. % gelled KOH with Zn mesh. Two types of cells were made. One cell where the two solid electrolytes with the respective electrodes were combined without a membrane and another cell with cellophane separator between the two electrolytes. The open circuit potential of the two cells are shown in FIG. 23. After 7 hours of rest on open circuit the potential of the two cells remain remarkably very stable. This has wide breakthrough implications as for the first time the creation of a membrane-less complete solid state high voltage aqueous $MnO_2|Zn$ battery (SS-HiVAB) is shown. Having no membrane helps in reducing the overall cost of the battery. The discharge performance of the two cells were also tested. Both were designed to discharge ~120 mAh/g and the performance is shown in FIG. 24. There is no difference in performance between a membrane-less cell and cellophane separator cell. The cycling performance of the no membrane high voltage solid state $MnO_2|Zn$ battery is also shown in FIG. 25, where it is clear that this breakthrough battery is able to cycle reversibility at the designed capacity without any capacity and energy fade. This is the first report of complete solid state high voltage membrane-less $MnO_2|Zn$ aqueous battery breaking the 2.5V barrier.

Having described various systems and methods herein, certain embodiments can include, but are not limited to:

In a first embodiment, a high voltage aqueous battery comprises: a cathode comprising a cathode electroactive material; an anode comprising an anode electroactive material; a catholyte solution in contact with the cathode, wherein the catholyte is not in contact with the anode; and a polymerized anolyte solution in contact with the anode.

A second embodiment can include the battery of the first embodiment, wherein the cathode electroactive material comprises manganese dioxide.

A third embodiment can include the battery of the second embodiment, wherein the anode electroactive material comprises zinc, aluminum, or a combination thereof.

A fourth embodiment can include the battery of any one of the first to third embodiments, wherein the cathode electroactive material comprises manganese dioxide or lead oxide.

A fifth embodiment can include the battery of any one of the first to fourth embodiments, wherein the anode electroactive material comprises zinc (Zn), aluminum (Al), magnesium (Mg), iron (Fe), or a combination thereof.

A sixth embodiment can include the battery of any one of the first to fifth embodiments, wherein the anode comprises iron oxide, iron hydroxide, bismuth oxide, bismuth, indium oxide, indium hydroxide, indium, copper, copper oxide, copper hydroxide, a manganese oxide, or any combination thereof.

A seventh embodiment can include the battery of any one of the first to sixth embodiments, wherein the cathode and the anode each contain a current collector made of carbon, lead, copper, nickel, silver, bismuth, titanium, magnesium, aluminum, gold, or a combination thereof.

An eighth embodiment can include the battery of the seventh embodiment, wherein the current collector is a mesh, foil, foam, felt, fibrous, a porous block architecture, or a combination thereof.

A ninth embodiment can include the battery of any one of the first to eighth embodiments, wherein the catholyte solution comprises potassium permanganate, sodium permanganate, lithium permanganate, manganese sulfate, manganese chloride, manganese nitrate, manganese perchlorate, manganese acetate, manganese triflate, manganese carbonate, manganese oxalate, manganese fluorosilicate, manganese ferrocyanide, manganese bromide, magnesium sulfate, zinc sulfate, zinc triflate, zinc acetate, zinc nitrate, bismuth chloride, bismuth nitrate, nitric acid, sulfuric acid, hydrochloric acid, sodium sulfate, potassium sulfate, sodium hydroxide, potassium hydroxide, titanium sulfate, titanium chloride, lithium nitrate, lithium chloride, lithium bromide, lithium bicarbonate, lithium acetate, lithium sulfate, lithium nitrite, lithium hydroxide, lithium perchlorate, lithium oxalate, lithium fluoride, lithium carbonate, lithium sulfate, lithium bromate, or a combination thereof.

A tenth embodiment can include the battery of any one of the first to ninth embodiments, wherein the catholyte solution has a pH between −1.2 and 7.

An eleventh embodiment can include the battery of any one of the first to tenth embodiments, wherein the catholyte solution comprises sulfuric acid, hydrochloric acid, or nitric acid at a concentration greater than 0 and less than or equal to 16M.

A twelfth embodiment can include the battery of any one of the first to eleventh embodiments, wherein the catholyte solution comprises potassium permanganate or a salt of permanganate at a concentration greater than 0 and less than or equal to 5M.

A thirteenth embodiment can include the battery of any one of the first to twelfth embodiments, wherein the catholyte solution comprises potassium permanganate or a salt of permanganate and an acid, wherein the molar ratio of the potassium permanganate or a salt of permanganate to the acid is 1:3.

A fourteenth embodiment can include the battery of any one of the first to thirteenth embodiments, wherein the cathode electroactive material comprises manganese dioxide mixed with carbon.

A fifteenth embodiment can include the battery of the fourteenth embodiment, wherein the carbon is graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof.

A sixteenth embodiment can include the battery of any one of the first to fifteenth embodiments, wherein the polymerized anolyte solution comprises zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate, acrylic acid, N,N'-Methylenebisacrylamide, potassium persulfate, ammonium persulfate, sodium persulfate, or a combination thereof.

A seventeenth embodiment can include the battery of any one of the first to sixteenth embodiments, wherein the polymerized anolyte solution has a pH between 10 and 15.13.

An eighteenth embodiment can include the battery of any one of the first to seventeenth embodiments, wherein the anode is a foil architecture, a mesh architecture, a perforated architecture, a foam architecture, a felt architecture or a powder architecture.

A nineteenth embodiment can include the battery of any one of the first to eighteenth embodiments, further comprising: a separator disposed between the catholyte solution and the polymerized anolyte solution.

A twentieth embodiment can include the battery of the nineteenth embodiment, wherein the separator is polyvinyl alcohol, a composite of polyvinyl alcohol and graphene oxide, CELGARD®, CELLOPHANE®, or a combination thereof.

A twenty first embodiment can include the battery of any one of the first to twentieth embodiments, wherein the catholyte solution is polymerized.

A twenty second embodiment can include the battery of any one of the first to twenty first embodiments, wherein the battery has an open circuit potential between 2V and 4V.

In a twenty third embodiment, a high voltage aqueous battery comprises: a cathode comprising a manganese dioxide, a spinel manganese oxide ($Mn_3O_4$), or a manganese oxide (MnO); an anode comprising zinc, aluminum, magnesium, or iron; a polymerized catholyte solution in contact with the cathode; and a polymerized anolyte solution in contact with the anode.

A twenty second embodiment can include the battery of the twenty third embodiment, wherein the polymerized catholyte solution comprises manganese sulfate, ammonium chloride, ammonium sulfate, manganese acetate, potassium permanganate, or a salt of permanganate at a concentration between 0 and 10M.

A twenty fifth embodiment can include the battery of the twenty third or twenty fourth embodiment, wherein the polymerized catholyte solution comprises sulfuric acid, hydrochloric acid, or nitric acid at a concentration between 0 and 16M.

A twenty sixth embodiment can include the battery of any one of the twenty third to twenty fifth embodiments, wherein the polymerized catholyte solution comprises potassium permanganate or a salt of permanganate and an acid, wherein the volumetric ratio of the potassium permanganate or a salt of permanganate to the acid is 5:1 to 1:5.

A twenty seventh embodiment can include the battery of any one of the twenty third to twenty sixth embodiments, wherein the polymerized catholyte solution comprises manganese sulfate, ammonium chloride and an acid, wherein the volumetric ratio of the manganese sulfate and ammonium chloride mixture to the acid is 5:1 to 1:5.

A twenty eighth embodiment can include the battery of any one of the twenty third to twenty seventh embodiments, wherein the manganese dioxide is mixed with carbon.

A twenty ninth embodiment can include the battery of the twenty eighth embodiment, wherein the mix of manganese dioxide and carbon further comprises cobalt oxide, cobalt hydroxide, lead oxide, lead hydroxide, or a combination thereof.

In a thirtieth embodiment, a high voltage aqueous battery comprises: a cathode comprising lead oxide ($PbO_2$); an anode comprising zinc, aluminum, magnesium or iron; a polymerized catholyte solution in contact with the cathode; and a polymerized anolyte solution in contact with the anode.

A thirty first embodiment can include the battery of the thirtieth embodiment, wherein the polymerized catholyte solution comprises potassium permanganate, sodium permanganate, lithium permanganate, calcium permanganate, manganese sulfate, manganese chloride, manganese nitrate, manganese perchlorate, manganese acetate, manganese triflate, manganese carbonate, manganese oxalate, manganese fluorosilicate, manganese ferrocyanide, manganese bromide, magnesium sulfate, ammonium chloride, ammonium sulfate, ammonium hydroxide, zinc sulfate, zinc triflate, zinc acetate, zinc nitrate, bismuth chloride, bismuth nitrate, nitric acid, sulfuric acid, hydrochloric acid, sodium sulfate, potassium sulfate, cobalt sulfate, lead sulfate, sodium hydroxide, potassium hydroxide, titanium sulfate, titanium chloride, lithium nitrate, lithium chloride, lithium bromide, lithium bicarbonate, lithium acetate, lithium sulfate, lithium nitrite, lithium hydroxide, lithium perchlorate, lithium oxalate, lithium fluoride, lithium carbonate, lithium sulfate, lithium bromate, polyvinyl alcohol, carboxymethyl cellulose, xanthum gum, carrageenan, acrylamide, potassium persulfate, sodium persulfate, ammonium persulfate, N,N'-Methylenebisacrylamide, or a combination thereof.

A thirty second embodiment can include the battery of the thirtieth or thirty first embodiment, wherein the polymerized catholyte solution has a pH between −1.2 and 7.

A thirty third embodiment can include the battery of any one of the thirtieth to thirty second embodiments, wherein the polymerized catholyte solution comprises lead sulfate and ammonium chloride at a concentration between 0 and 10M.

A thirty fourth embodiment can include the battery of any one of the thirtieth to thirty third embodiments, wherein the polymerized catholyte solution comprises sulfuric acid, hydrochloric acid, or nitric acid at a concentration between 0 and 16M.

A thirty fifth embodiment can include the battery of any one of the thirtieth to thirty fourth embodiments, wherein the polymerized catholyte solution comprises lead sulfate, ammonium chloride, and an acid, wherein the molar ratio of the lead sulfate and ammonium chloride mixture to the acid is 0.1:5 to 5:0.1.

A thirty sixth embodiment can include the battery of any one of the thirtieth to thirty fifth embodiments, wherein the cathode further comprises carbon mixed with the lead oxide ($PbO_2$).

A thirty seventh embodiment can include the battery of the thirty sixth embodiment, where the lead oxide ($PbO_2$) is between 1 and 99 wt. %, and the carbon is between 1 and 99 wt. %.

A thirty eighth embodiment can include the battery of any one of the thirtieth to thirty seventh embodiments, wherein the polymerized anolyte solution has a pH between 7 and 15.13.

In a thirty ninth embodiment, a method of operating a battery comprises: discharging a battery according to any one of the first to thirty eight embodiments; and charging the battery after the battery is discharged.

A fortieth embodiment can include the method of the thirty ninth embodiment, wherein the battery is charged a plurality of times.

A fortieth first embodiment can include the method of the thirty eighth or fortieth embodiment, wherein the battery is discharged at a voltage between 2V and 3.6V.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

What is claimed is:

1. A battery, wherein the battery is a high voltage aqueous battery, comprising:
   a cathode comprising a cathode electroactive material;
   an anode comprising an anode electroactive material;
   a catholyte solution in contact with the cathode, wherein the catholyte solution is not in contact with the anode; and
   a polymerized anolyte solution in contact with the anode, wherein the cathode comprises lead oxide ($PbO_2$);
   wherein the anode comprises zinc, aluminum, magnesium, or iron; and
   wherein the catholyte solution is a polymerized catholyte solution.

2. The battery of claim 1, wherein the cathode electroactive material further comprises manganese dioxide.

3. The battery of claim 1, wherein the anode further comprises iron oxide, iron hydroxide, bismuth oxide, bismuth, indium oxide, indium hydroxide, indium, copper, copper oxide, copper hydroxide, a manganese oxide, or any combination thereof.

4. The battery as recited in claim 1, wherein the cathode and the anode each contain a current collector made of carbon, lead, copper, nickel, silver, bismuth, titanium, magnesium, aluminum, gold, or a combination thereof.

5. The battery of claim 4, wherein the current collector is a mesh, foil, foam, felt, fibrous, a porous block architecture, or a combination thereof.

6. The battery of claim 1, wherein the polymerized catholyte solution comprises potassium permanganate, sodium permanganate, lithium permanganate, manganese sulfate, manganese chloride, manganese nitrate, manganese perchlorate, manganese acetate, manganese triflate, manganese carbonate, manganese oxalate, manganese fluorosilicate, manganese ferrocyanide, manganese bromide, magnesium sulfate, zinc sulfate, zinc triflate, zinc acetate, zinc nitrate, bismuth chloride, bismuth nitrate, nitric acid, sulfuric acid, hydrochloric acid, sodium sulfate, potassium sulfate, sodium hydroxide, potassium hydroxide, titanium sulfate, titanium chloride, lithium nitrate, lithium chloride, lithium bromide, lithium bicarbonate, lithium acetate, lithium sulfate, lithium nitrate, lithium nitrite, lithium hydroxide, lithium perchlorate, lithium oxalate, lithium fluoride, lithium carbonate, lithium sulfate, lithium bromate, or a combination thereof.

7. The battery of claim 1, wherein the polymerized catholyte solution has a pH between −1.2 and 7.

8. The battery of claim 1, wherein the polymerized catholyte solution comprises a salt of permanganate at a concentration greater than 0 and less than or equal to 5M.

9. The battery of claim 1, wherein the polymerized catholyte solution comprises sulfuric acid, hydrochloric acid, or nitric acid at a concentration greater than 0 and less than or equal to 16M.

10. The battery of claim 1, wherein the polymerized catholyte solution comprises a salt of permanganate and an acid, wherein a molar ratio of the salt of permanganate to the acid is 1:3.

11. The battery of claim 1, wherein the cathode electroactive material further comprises carbon.

12. The battery of claim 11, wherein the carbon is graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof.

13. The battery of claim 1, wherein the polymerized anolyte solution comprises zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrite, lithium perchlorate, lithium oxalate, lithium fluoride, lithium carbonate, lithium bromate, acrylic acid, N,N'-Methylenebisacrylamide, potassium persulfate, ammonium persulfate, sodium persulfate, or a combination thereof.

14. The battery of claim 1, wherein the polymerized anolyte solution has a pH between 10 and 15.13.

15. The battery of claim 1, wherein the anode is a foil architecture, a mesh architecture, a perforated architecture, a foam architecture, a felt architecture, or a powder architecture.

16. The battery of claim 1, further comprising:
a separator disposed between the polymerized catholyte solution and the polymerized anolyte solution.

17. The battery of claim 16, wherein the separator is polyvinyl alcohol, a composite of polyvinyl alcohol and graphene oxide, a microporous separator, or a combination thereof.

18. The battery of claim 1, wherein the battery has an open circuit potential between 2V and 4V.

19. A high voltage aqueous battery comprising:
a cathode comprising a manganese dioxide, a spinel manganese oxide ($Mn_3O_4$), or a manganese oxide (MnO);
an anode comprising zinc, aluminum, magnesium, or iron;
a polymerized catholyte solution in contact with the cathode; and
a polymerized anolyte solution in contact with the anode, wherein the polymerized catholyte solution comprises manganese sulfate, ammonium chloride, ammonium sulfate, manganese acetate, or a salt of permanganate at a concentration between 0 and 10M.

20. The battery of claim 19, wherein the polymerized catholyte solution further comprises sulfuric acid, hydrochloric acid, or nitric acid at a concentration between 0 and 16M.

21. The battery of claim 19, wherein the polymerized catholyte solution comprises the salt of permanganate and an acid, wherein the volumetric ratio of the salt of permanganate to the acid is 5:1 to 1:5.

22. The battery of claim 19, wherein the polymerized catholyte solution comprises manganese sulfate, ammonium chloride, and an acid, wherein the volumetric ratio of the manganese sulfate and ammonium chloride mixture to the acid is 5:1 to 1:5.

23. The battery of claim 19, wherein the manganese dioxide is mixed with carbon.

24. The battery of claim 23, wherein the mix of manganese dioxide and carbon further comprises cobalt oxide, cobalt hydroxide, lead oxide, lead hydroxide, or a combination thereof.

25. The battery of claim 1, wherein the polymerized catholyte solution comprises potassium permanganate, sodium permanganate, lithium permanganate, calcium permanganate, manganese sulfate, manganese chloride, manganese nitrate, manganese perchlorate, manganese acetate, manganese triflate, manganese carbonate, manganese oxalate, manganese fluorosilicate, manganese ferrocyanide, manganese bromide, magnesium sulfate, ammonium chloride, ammonium sulfate, ammonium hydroxide, zinc sulfate, zinc triflate, zinc acetate, zinc nitrate, bismuth chloride, bismuth nitrate, nitric acid, sulfuric acid, hydrochloric acid, sodium sulfate, potassium sulfate, cobalt sulfate, lead sulfate, sodium hydroxide, potassium hydroxide, titanium sulfate, titanium chloride, lithium nitrate, lithium chloride, lithium bromide, lithium bicarbonate, lithium acetate, lithium sulfate, lithium nitrite, lithium hydroxide, lithium perchlorate, lithium oxalate, lithium fluoride, lithium carbonate, lithium sulfate, lithium bromate, polyvinyl alcohol, carboxymethyl cellulose, xanthum gum, carrageenan, acrylamide, potassium persulfate, sodium persulfate, ammonium persulfate, N,N'-Methylenebisacrylamide, or a combination thereof.

26. The battery of claim 1, wherein the polymerized catholyte solution comprises lead sulfate and ammonium chloride at a concentration between 0 and 10M.

27. The battery of claim 1, wherein the polymerized catholyte solution comprises lead sulfate, ammonium chloride, and an acid, wherein a molar ratio of the lead sulfate and ammonium chloride mixture to the acid is 0.1:5 to 5:0.1.

28. The battery of claim 1, wherein the cathode further comprises carbon mixed with the lead oxide ($PbO_2$).

29. The battery of claim 28, where the lead oxide ($PbO_2$) is between 1 and 99 wt. %, and the carbon is between 1 and 99 wt. %.

30. The battery of claim 1, wherein the polymerized anolyte solution has a pH between 7 and 15.13.

31. The battery of claim 8, wherein the salt of permanganate comprises potassium permanganate.

32. The battery of claim 10, wherein the salt of permanganate comprises potassium permanganate.

33. The battery of claim 19, wherein the polymerized catholyte solution comprises the salt of permanganate, comprising potassium permanganate.

34. The battery of claim 21, wherein the salt of permanganate comprises potassium permanganate.

35. A high voltage aqueous battery comprising:
- a cathode comprising a manganese dioxide, a spinel manganese oxide ($Mn_3O_4$), or a manganese oxide (MnO);
- an anode comprising zinc, aluminum, magnesium, or iron;
- a polymerized catholyte solution in contact with the cathode; and
- a polymerized anolyte solution in contact with the anode, wherein the polymerized catholyte solution comprises manganese sulfate, ammonium chloride, and an acid, wherein the volumetric ratio of the manganese sulfate and ammonium chloride mixture to the acid is 5:1 to 1:5.

* * * * *